United States Patent
Tsuk et al.

(10) Patent No.: US 9,977,518 B2
(45) Date of Patent: May 22, 2018

(54) SCROLLING BASED ON ROTATIONAL MOVEMENT

(71) Applicant: Apple Inc., Cupertino, CA (US)

(72) Inventors: Robert W. Tsuk, Cupertino, CA (US); Jeffrey L. Robbin, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 307 days.

(21) Appl. No.: 14/685,484

(22) Filed: Apr. 13, 2015

(65) Prior Publication Data

US 2015/0248175 A1    Sep. 3, 2015

Related U.S. Application Data

(60) Continuation of application No. 11/959,942, filed on Dec. 19, 2007, now Pat. No. 9,009,626, which is a
(Continued)

(51) Int. Cl.
*G06F 3/0362* (2013.01)
*G06F 1/16* (2006.01)
(Continued)

(52) U.S. Cl.
CPC .......... *G06F 3/0362* (2013.01); *G06F 1/169* (2013.01); *G06F 1/1626* (2013.01);
(Continued)

(58) Field of Classification Search
CPC .................................................... G06F 1/1626
(Continued)

(56) References Cited

U.S. PATENT DOCUMENTS 1,061,578 A   5/1913   Wischhusen et al.
2,063,276 A   12/1936  Thomas
(Continued)

FOREIGN PATENT DOCUMENTS

CN   1139235 A   1/1997
CN   1455615 A   11/2003
(Continued)

OTHER PUBLICATIONS

3DConnexion, "Product Overview—ErgoCommander", www.logicad3d.com/products/ergocommander.htm, downloaded Apr. 8, 2002, 2 pages.
(Continued)

*Primary Examiner* — William Titcomb
(74) *Attorney, Agent, or Firm* — Morgan, Lewis & Bockius LLP

(57) ABSTRACT

Improved approaches for users to interact with graphical user interfaces of computing devices are disclosed. A rotational user action supplied by a user via a user input device can provide accelerated scrolling. The accelerated nature of the scrolling enables users to scroll or traverse a lengthy data set (e.g., list of items) faster and with greater ease. The amount of acceleration provided can be performed in successive stages, and/or performed based on the speed of the rotational user action. In one embodiment, the rotational user action is transformed into linear action with respect to a graphical user interface. The resulting acceleration effect causes the linear action to be enhanced such that a lengthy data set is able to be rapidly traversed.

21 Claims, 15 Drawing Sheets

Related U.S. Application Data division of application No. 10/256,716, filed on Sep. 26, 2002, now Pat. No. 7,312,785.

(60) Provisional application No. 60/387,692, filed on Jun. 10, 2002, provisional application No. 60/359,551, filed on Feb. 25, 2002, provisional application No. 60/346,237, filed on Oct. 22, 2001.

(51) Int. Cl.

| | | |
|---|---|---|
| *G06F 3/0354* | (2013.01) | |
| *G06F 3/0485* | (2013.01) | |
| *G06F 3/038* | (2013.01) | |
| *G06F 3/16* | (2006.01) | |
| *G09G 5/34* | (2006.01) | |
| *H04M 1/23* | (2006.01) | |
| *H04M 1/725* | (2006.01) | |

(52) U.S. Cl.
CPC ............ *G06F 1/1662* (2013.01); *G06F 3/038* (2013.01); *G06F 3/03543* (2013.01); *G06F 3/0485* (2013.01); *G06F 3/167* (2013.01); *G09G 5/34* (2013.01); *H04M 1/233* (2013.01); *H04M 1/72583* (2013.01)

(58) Field of Classification Search
USPC ...................................................... 345/184
See application file for complete search history.

(56) References Cited

U.S. PATENT DOCUMENTS

| | | |
|---|---|---|
| 2,798,907 A | 7/1957 | Schneider |
| 2,903,229 A | 9/1959 | Lange |
| 2,945,111 A | 7/1960 | McCormick |
| 3,005,055 A | 10/1961 | Mattke |
| 3,965,399 A | 6/1976 | Walker, Jr. et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper, Jr. |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,266,144 A | 5/1981 | Bristol |
| 4,293,734 A | 10/1981 | Pepper, Jr. |
| D264,969 S | 6/1982 | McGoutry |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newel |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,934,889 A | 6/1990 | Kurosaki |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Malley et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,494,157 A | 2/1996 | Golenz et al. |
| 5,495,566 A | 2/1996 | Kwatinetz |
| 5,508,703 A | 4/1996 | Okamura et al. |
| 5,508,717 A | 4/1996 | Miller |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |

(56) References Cited

U.S. PATENT DOCUMENTS

| | | |
|---|---|---|
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Teres |
| 5,815,141 A | 9/1998 | Phares |
| 5,825,351 A | 10/1998 | Tam |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,852,352 A | 12/1998 | Suriano |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A * | 5/1999 | Kishi ............... G06F 3/04847 |
| | | 178/19.01 |
| 5,907,152 A | 5/1999 | Dandiliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville |
| 6,128,006 A | 10/2000 | Rosenberg et al. |
| 6,131,048 A | 10/2000 | Sudo et al. |
| 6,141,068 A | 10/2000 | Lijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| 6,229,456 B1 | 5/2001 | Engholm et al. |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,939 B1 * | 10/2001 | Decker ............... B60K 35/00 |
| | | 345/157 |
| 6,300,946 B1 | 10/2001 | Lincke et al. |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| 6,323,846 B1 | 11/2001 | Westerman et al. |
| D452,250 S | 12/2001 | Chan |
| 6,340,800 B1 | 1/2002 | Zhai et al. |
| 6,347,290 B1 | 2/2002 | Bartlett |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,404,354 B1 * | 6/2002 | Decker ............... G05G 1/08 |
| | | 200/318 |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,461,238 B1 * | 10/2002 | Rehkemper ............ A63F 13/08 |
| | | 273/442 |
| 6,465,271 B1 | 10/2002 | Ko et al. |
| 6,473,069 B1 | 10/2002 | Gerphelde |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |

(56) References Cited

U.S. PATENT DOCUMENTS

| | | | |
|---|---|---|---|
| 6,640,250 B1 | 10/2003 | Chang et al. | |
| 6,650,975 B2 | 11/2003 | Ruffner | |
| D483,809 S | 12/2003 | Lim | |
| 6,658,773 B2 | 12/2003 | Rohne et al. | |
| 6,664,951 B1 | 12/2003 | Fujii et al. | |
| 6,677,927 B1 | 1/2004 | Bruck et al. | |
| 6,678,891 B1 | 1/2004 | Wilcox et al. | |
| 6,686,904 B1 | 2/2004 | Sherman et al. | |
| 6,686,906 B2 | 2/2004 | Salminen et al. | |
| 6,703,550 B2* | 3/2004 | Chu | G06F 3/016 345/156 |
| 6,704,032 B1* | 3/2004 | Falcon | G06F 3/0481 715/746 |
| 6,724,817 B1 | 4/2004 | Simpson et al. | |
| 6,727,889 B2 | 4/2004 | Shaw | |
| D489,731 S | 5/2004 | Huang | |
| 6,734,883 B1 | 5/2004 | Wynn et al. | |
| 6,738,045 B2 | 5/2004 | Hinckley et al. | |
| 6,750,803 B2 | 6/2004 | Yates et al. | |
| 6,781,576 B2 | 8/2004 | Tamura | |
| 6,784,384 B2 | 8/2004 | Park et al. | |
| 6,788,288 B2 | 9/2004 | Ano | |
| 6,791,533 B2 | 9/2004 | Su | |
| 6,795,057 B2 | 9/2004 | Gordon | |
| D497,618 S | 10/2004 | Andre et al. | |
| 6,810,271 B1 | 10/2004 | Wood et al. | |
| 6,822,640 B2 | 11/2004 | Derocher | |
| 6,834,975 B2 | 12/2004 | Chu-Chia et al. | |
| 6,844,872 B1 | 1/2005 | Farag et al. | |
| 6,847,351 B2 | 1/2005 | Noguera | |
| 6,855,899 B2 | 2/2005 | Sotome | |
| 6,865,718 B2 | 3/2005 | Montalcini | |
| 6,886,842 B2 | 5/2005 | Vey et al. | |
| 6,894,916 B2 | 5/2005 | Reohr et al. | |
| D506,476 S | 6/2005 | Andre et al. | |
| 6,922,189 B2 | 7/2005 | Fujiyoshi | |
| 6,930,494 B2 | 8/2005 | Tesdahl et al. | |
| 6,958,614 B2 | 10/2005 | Morimoto | |
| 6,977,808 B2 | 12/2005 | Lam et al. | |
| 6,978,127 B1 | 12/2005 | Bulthuis et al. | |
| 6,985,137 B2 | 1/2006 | Kaikuranta | |
| 7,006,077 B1 | 2/2006 | Uusimaki | |
| 7,019,225 B2 | 3/2006 | Matsumoto et al. | |
| 7,046,230 B2 | 5/2006 | Zadesky et al. | |
| 7,050,292 B2 | 5/2006 | Shimura et al. | |
| 7,058,903 B1 | 6/2006 | Jonach et al. | |
| 7,069,044 B2 | 6/2006 | Okada et al. | |
| 7,078,633 B2 | 7/2006 | Ihalainen | |
| 7,084,856 B2 | 8/2006 | Huppi | |
| 7,113,196 B2 | 9/2006 | Kerr | |
| 7,117,136 B1 | 10/2006 | Rosedale | |
| 7,119,792 B1 | 10/2006 | Andre et al. | |
| 7,215,319 B2 | 5/2007 | Kamijo et al. | |
| 7,233,318 B1 | 6/2007 | Farag et al. | |
| 7,236,154 B1 | 6/2007 | Kerr et al. | |
| 7,236,159 B1 | 6/2007 | Siversson | |
| 7,253,643 B1 | 8/2007 | Sequine | |
| 7,279,647 B2 | 10/2007 | Philipp | |
| 7,288,732 B2 | 10/2007 | Hashida | |
| 7,297,883 B2 | 11/2007 | Rochon et al. | |
| 7,310,089 B2 | 12/2007 | Baker et al. | |
| 7,312,785 B2* | 12/2007 | Tsuk | G06F 1/1626 345/156 |
| 7,321,103 B2 | 1/2008 | Nakanishi et al. | |
| 7,325,195 B1 | 1/2008 | Arant | |
| 7,333,092 B2 | 2/2008 | Zadesky et al. | |
| 7,345,671 B2 | 3/2008 | Robbin et al. | |
| 7,348,898 B2 | 3/2008 | Ono | |
| 7,365,737 B2 | 4/2008 | Marvit et al. | |
| 7,382,139 B2 | 6/2008 | MacKey | |
| 7,394,038 B2 | 7/2008 | Chang | |
| 7,395,081 B2 | 7/2008 | Bonnelykke et al. | |
| 7,397,467 B2 | 7/2008 | Park et al. | |
| 7,439,963 B2 | 10/2008 | Geaghan et al. | |
| 7,466,307 B2 | 12/2008 | Trent, Jr. et al. | |
| 7,479,949 B2 | 1/2009 | Jobs et al. | |
| 7,486,323 B2 | 2/2009 | Lee et al. | |
| 7,495,659 B2 | 2/2009 | Marriott et al. | |
| 7,502,016 B2 | 3/2009 | Trent, Jr. et al. | |
| 7,503,193 B2 | 3/2009 | Schoene et al. | |
| 7,593,782 B2 | 9/2009 | Jobs et al. | |
| 7,645,955 B2 | 1/2010 | Huang et al. | |
| 7,671,837 B2 | 3/2010 | Forsblad et al. | |
| 7,689,466 B1 | 3/2010 | Benbrahim et al. | |
| 7,708,051 B2 | 5/2010 | Katsumi et al. | |
| 7,710,393 B2 | 5/2010 | Tsuk et al. | |
| 7,710,394 B2 | 5/2010 | Robbin et al. | |
| 7,710,409 B2 | 5/2010 | Robbin et al. | |
| 7,716,582 B2 | 5/2010 | Mueller | |
| 7,769,794 B2 | 8/2010 | Moore et al. | |
| 7,772,507 B2 | 8/2010 | Orr et al. | |
| 7,910,843 B2 | 3/2011 | Rothkopf et al. | |
| 7,932,897 B2 | 4/2011 | Elias et al. | |
| 8,125,461 B2 | 2/2012 | Weber et al. | |
| 8,188,357 B2 | 5/2012 | Robbin et al. | |
| 8,274,479 B2 | 9/2012 | Prest et al. | |
| 8,416,198 B2 | 4/2013 | Rathnam et al. | |
| 8,482,530 B2 | 7/2013 | Bollinger | |
| 8,683,378 B2 | 3/2014 | Bull et al. | |
| 8,866,780 B2 | 10/2014 | Rathnam et al. | |
| 8,933,890 B2 | 1/2015 | Lampell et al. | |
| 2001/0000537 A1 | 4/2001 | Inala et al. | |
| 2001/0011991 A1 | 8/2001 | Wang et al. | |
| 2001/0011993 A1 | 8/2001 | Saarinen | |
| 2001/0033270 A1 | 10/2001 | Osawa et al. | |
| 2001/0043545 A1 | 11/2001 | Aratani | |
| 2001/0050673 A1 | 12/2001 | Davenport | |
| 2001/0051046 A1 | 12/2001 | Watanabe et al. | |
| 2002/0000978 A1 | 1/2002 | Gerpheide | |
| 2002/0011993 A1 | 1/2002 | Lui et al. | |
| 2002/0027547 A1 | 3/2002 | Kamijo | |
| 2002/0030665 A1 | 3/2002 | Ano | |
| 2002/0033848 A1 | 3/2002 | Sciammarella et al. | |
| 2002/0039493 A1 | 4/2002 | Tanaka | |
| 2002/0045960 A1 | 4/2002 | Phillips et al. | |
| 2002/0059584 A1 | 5/2002 | Ferman et al. | |
| 2002/0071550 A1 | 6/2002 | Pletikosa | |
| 2002/0089545 A1 | 7/2002 | Montalcini | |
| 2002/0103796 A1 | 8/2002 | Hartley | |
| 2002/0118131 A1 | 8/2002 | Yates et al. | |
| 2002/0118169 A1 | 8/2002 | Hinckley et al. | |
| 2002/0145594 A1 | 10/2002 | Derocher | |
| 2002/0154090 A1 | 10/2002 | Lin | |
| 2002/0158844 A1 | 10/2002 | McLoone et al. | |
| 2002/0164156 A1 | 11/2002 | Bilbrey | |
| 2002/0168947 A1 | 11/2002 | Lemley | |
| 2002/0180701 A1 | 12/2002 | Hayama et al. | |
| 2002/0196239 A1 | 12/2002 | Lee | |
| 2003/0002246 A1 | 1/2003 | Kerr | |
| 2003/0025679 A1 | 2/2003 | Taylor et al. | |
| 2003/0028346 A1 | 2/2003 | Sinclair et al. | |
| 2003/0043121 A1 | 3/2003 | Chen | |
| 2003/0043174 A1 | 3/2003 | Hinckley et al. | |
| 2003/0048250 A1* | 3/2003 | Boon | G06F 3/016 345/156 |
| 2003/0050092 A1 | 3/2003 | Yun | |
| 2003/0068053 A1* | 4/2003 | Chu | G06F 3/016 381/118 |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |
| 2003/0091377 A1 | 5/2003 | Hsu et al. | |
| 2003/0095095 A1 | 5/2003 | Pihlaja | |
| 2003/0095096 A1 | 5/2003 | Robbin et al. | |
| 2003/0098851 A1 | 5/2003 | Brink | |
| 2003/0103043 A1 | 6/2003 | Mulligan et al. | |
| 2003/0122792 A1 | 7/2003 | Yamamoto et al. | |
| 2003/0135292 A1 | 7/2003 | Husgafvel et al. | |
| 2003/0142081 A1 | 7/2003 | Iizuka et al. | |
| 2003/0184517 A1 | 10/2003 | Senzui et al. | |
| 2003/0197740 A1 | 10/2003 | Reponen | |
| 2003/0206202 A1 | 11/2003 | Moriya | |
| 2003/0210537 A1 | 11/2003 | Engelmann | |
| 2003/0224831 A1 | 12/2003 | Engstrom et al. | |

(56) References Cited

U.S. PATENT DOCUMENTS

| | | |
|---|---|---|
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109028 A1 | 6/2004 | Stern et al. |
| 2004/0109357 A1 | 6/2004 | Cernea et al. |
| 2004/0145613 A1 | 7/2004 | Stavely et al. |
| 2004/0150619 A1 | 8/2004 | Baudisch et al. |
| 2004/0156192 A1 | 8/2004 | Kerr et al. |
| 2004/0166912 A1* | 8/2004 | Stienstra ................ G06F 3/033 463/1 |
| 2004/0178997 A1 | 9/2004 | Gillespie et al. |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender |
| 2005/0052425 A1 | 3/2005 | Zadesky et al. |
| 2005/0052426 A1 | 3/2005 | Hagermoser et al. |
| 2005/0052429 A1 | 3/2005 | Philipp |
| 2005/0068304 A1 | 3/2005 | Lewis et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0125147 A1 | 6/2005 | Mueller |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0156881 A1 | 7/2005 | Trent, Jr. et al. |
| 2005/0162402 A1 | 7/2005 | Watanabe et al. |
| 2005/0204309 A1 | 9/2005 | Szeto |
| 2005/0212760 A1 | 9/2005 | Marvit et al. |
| 2005/0237308 A1 | 10/2005 | Autio et al. |
| 2006/0017692 A1 | 1/2006 | Wehrenberg et al. |
| 2006/0026521 A1 | 2/2006 | Hotelling et al. |
| 2006/0032680 A1 | 2/2006 | Elias et al. |
| 2006/0038791 A1 | 2/2006 | MacKey |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0197753 A1 | 9/2006 | Hotelling |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0044036 A1 | 2/2007 | Ishimura et al. |
| 2007/0052044 A1* | 3/2007 | Forsblad ............ H03K 17/9622 257/414 |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0120834 A1 | 5/2007 | Boillot |
| 2007/0125852 A1 | 6/2007 | Rosenberg |
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0180409 A1 | 8/2007 | Sohn et al. |
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Phillips |
| 2007/0296709 A1 | 12/2007 | GuangHai |
| 2008/0001770 A1 | 1/2008 | Ito et al. |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0062141 A1 | 3/2008 | Chandhri |
| 2008/0066016 A1 | 3/2008 | Dowdy et al. |
| 2008/0069412 A1 | 3/2008 | Champagne et al. |
| 2008/0071810 A1 | 3/2008 | Casto et al. |
| 2008/0079699 A1 | 4/2008 | MacKey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0143681 A1 | 6/2008 | XiaoPing |
| 2008/0165144 A1 | 7/2008 | Forstall et al. |
| 2008/0165158 A1 | 7/2008 | Hotelling et al. |
| 2008/0166968 A1 | 7/2008 | Tang et al. |
| 2008/0196945 A1 | 8/2008 | Konstas |
| 2008/0201751 A1 | 8/2008 | Ahmed et al. |
| 2008/0202824 A1 | 8/2008 | Philipp et al. |
| 2008/0209442 A1 | 8/2008 | Setlur et al. |
| 2008/0264767 A1 | 10/2008 | Chen et al. |
| 2008/0280651 A1 | 11/2008 | Duarte |
| 2008/0284742 A1 | 11/2008 | Prest |
| 2008/0293274 A1 | 11/2008 | Milan |
| 2008/0300055 A1 | 12/2008 | Lutnick et al. |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0064031 A1 | 3/2009 | Bull et al. |
| 2009/0073130 A1 | 3/2009 | Weber et al. |
| 2009/0078551 A1 | 3/2009 | Kang |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0165708 A1 | 7/2009 | Fadell et al. |
| 2009/0166098 A1 | 7/2009 | Sunder |
| 2009/0167542 A1 | 7/2009 | Culbert et al. |
| 2009/0167704 A1 | 7/2009 | Terlizzi et al. |
| 2009/0170532 A1 | 7/2009 | Lee et al. |
| 2009/0179854 A1 | 7/2009 | Weber et al. |
| 2009/0197059 A1 | 8/2009 | Weber et al. |
| 2009/0229892 A1 | 9/2009 | Fisher et al. |

(56) References Cited

U.S. PATENT DOCUMENTS

| | | | |
|---|---|---|---|
| 2009/0273573 | A1 | 11/2009 | Hotelling |
| 2009/0303204 | A1 | 12/2009 | Nasiri et al. |
| 2009/0307633 | A1 | 12/2009 | Haughay et al. |
| 2010/0045705 | A1 | 2/2010 | Vertegaal et al. |
| 2010/0058251 | A1 | 3/2010 | Rottler et al. |
| 2010/0060568 | A1 | 3/2010 | Fisher et al. |
| 2010/0073319 | A1 | 3/2010 | Lyon et al. |
| 2010/0149127 | A1 | 6/2010 | Fisher et al. |
| 2010/0214216 | A1 | 8/2010 | Nasiri et al. |
| 2010/0289759 | A1 | 11/2010 | Fisher et al. |
| 2010/0313409 | A1 | 12/2010 | Weber et al. |
| 2011/0005845 | A1 | 1/2011 | Hotelling et al. |

FOREIGN PATENT DOCUMENTS

| | | |
|---|---|---|
| CN | 1499356 A | 5/2004 |
| CN | 1659506 A | 8/2005 |
| DE | 3615742 A1 | 11/1987 |
| DE | 19722636 A1 | 12/1998 |
| DE | 10022537 A1 | 11/2000 |
| DE | 20019074 U1 | 1/2001 |
| DE | 102004043663 A1 | 4/2006 |
| EP | 0 178 157 A2 | 4/1986 |
| EP | 0 419 145 A1 | 3/1991 |
| EP | 0 498 540 A2 | 12/1992 |
| EP | 0 521 683 A2 | 1/1993 |
| EP | 0 551 778 A1 | 7/1993 |
| EP | 0 674 288 A1 | 9/1995 |
| EP | 0 731 407 A1 | 9/1996 |
| EP | 0 880 091 A2 | 11/1998 |
| EP | 1 026 713 A1 | 8/2000 |
| EP | 1 081 922 A2 | 3/2001 |
| EP | 1 098 241 A2 | 5/2001 |
| EP | 1 133 057 A2 | 9/2001 |
| EP | 1 162 826 A2 | 12/2001 |
| EP | 1 168 396 A2 | 1/2002 |
| EP | 1 205 836 A2 | 5/2002 |
| EP | 1 244 053 A2 | 9/2002 |
| EP | 1 251 455 A2 | 10/2002 |
| EP | 1 263 193 A2 | 12/2002 |
| EP | 1 347 481 A1 | 9/2003 |
| EP | 1 376 326 A1 | 1/2004 |
| EP | 1 467 392 A2 | 10/2004 |
| EP | 1 482 401 A2 | 12/2004 |
| EP | 1 496 467 A2 | 1/2005 |
| EP | 1 517 228 A2 | 3/2005 |
| EP | 1 542 437 A2 | 6/2005 |
| EP | 1 589 407 A1 | 10/2005 |
| EP | 1 784 058 A2 | 5/2007 |
| EP | 1 841 188 A2 | 10/2007 |
| EP | 1 850 218 A2 | 10/2007 |
| EP | 1 876 058 A2 | 1/2008 |
| EP | 1 876 711 A1 | 1/2008 |
| FR | 2686440 A1 | 7/1993 |
| GB | 2 015 167 A | 9/1979 |
| GB | 2 072 389 A | 9/1981 |
| GB | 2 315 186 A | 1/1998 |
| GB | 2 333 215 A | 7/1999 |
| GB | 2 391 060 A | 1/2004 |
| GB | 2 402 105 A | 12/2004 |
| JP | 57-95722 | 6/1982 |
| JP | 57-97626 | 6/1982 |
| JP | 61-117619 A | 6/1986 |
| JP | 61-124009 | 6/1986 |
| JP | 63-020411 | 1/1988 |
| JP | 63-106826 | 5/1988 |
| JP | 63-181022 | 7/1988 |
| JP | 63-298518 | 12/1988 |
| JP | 3-57617 | 6/1991 |
| JP | 03-192418 | 8/1991 |
| JP | 04-032920 | 2/1992 |
| JP | H04205408 A | 7/1992 |
| JP | 05-041135 | 2/1993 |
| JP | 05-080938 | 4/1993 |
| JP | 05-101741 | 4/1993 |
| JP | 5-36623 | 5/1993 |
| JP | 05-189110 | 7/1993 |
| JP | 05-205565 | 8/1993 |
| JP | 05-211021 | 8/1993 |
| JP | 05-217464 | 8/1993 |
| JP | 05-233141 | 9/1993 |
| JP | 05-262276 | 10/1993 |
| JP | 05-265656 | 10/1993 |
| JP | 05-274956 | 10/1993 |
| JP | 05-289811 | 11/1993 |
| JP | 05-298955 | 11/1993 |
| JP | 05-325723 | 12/1993 |
| JP | 06-020570 | 1/1994 |
| JP | 06-028433 | 2/1994 |
| JP | 06-084428 | 3/1994 |
| JP | 06-089636 | 3/1994 |
| JP | 06-096639 | 4/1994 |
| JP | 06-111685 | 4/1994 |
| JP | 6-111695 | 4/1994 |
| JP | 06-139879 | 5/1994 |
| JP | 06-187078 | 7/1994 |
| JP | 06-267382 | 9/1994 |
| JP | 06-283993 | 10/1994 |
| JP | 06-333459 | 12/1994 |
| JP | 07-107574 | 4/1995 |
| JP | 7-41882 | 7/1995 |
| JP | 7-201249 | 8/1995 |
| JP | 07-201256 | 8/1995 |
| JP | 07-253838 | 10/1995 |
| JP | 7-261899 | 10/1995 |
| JP | 07-261922 A | 10/1995 |
| JP | 7-296670 | 11/1995 |
| JP | 07-319001 | 12/1995 |
| JP | 08-016292 | 1/1996 |
| JP | 08-115158 | 5/1996 |
| JP | 08-203387 | 8/1996 |
| JP | 08-293226 | 11/1996 |
| JP | 08-298045 | 11/1996 |
| JP | 08-299541 | 11/1996 |
| JP | 08-316664 | 11/1996 |
| JP | 09-044289 | 2/1997 |
| JP | 09-069023 | 3/1997 |
| JP | 09-128148 | 5/1997 |
| JP | 9-134248 | 5/1997 |
| JP | 09-218747 | 8/1997 |
| JP | 09-230993 | 9/1997 |
| JP | 9-230993 | 9/1997 |
| JP | 09-231858 | 9/1997 |
| JP | 09-233161 | 9/1997 |
| JP | 9-251347 | 9/1997 |
| JP | 09-258895 | 10/1997 |
| JP | 09-288926 | 11/1997 |
| JP | 9-512979 | 12/1997 |
| JP | 10-063467 | 3/1998 |
| JP | 10-074127 | 3/1998 |
| JP | 10-074429 | 3/1998 |
| JP | 10-198507 | 7/1998 |
| JP | 10-227878 | 8/1998 |
| JP | 10-240693 | 9/1998 |
| JP | 10-320322 | 12/1998 |
| JP | 10-326149 | 12/1998 |
| JP | 11-024834 | 1/1999 |
| JP | H1124835 A | 1/1999 |
| JP | 11-068685 | 3/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-200147 | 7/2000 |
| JP | 2000-215549 A | 8/2000 |
| JP | 2000-267777 | 9/2000 |
| JP | 2000-267786 | 9/2000 |

(56) References Cited

FOREIGN PATENT DOCUMENTS

| | | |
|---|---|---|
| JP | 2000-267797 | 9/2000 |
| JP | 2000-353045 | 12/2000 |
| JP | 2001-011769 | 1/2001 |
| JP | 2001-022508 | 1/2001 |
| JP | 2001-160850 | 6/2001 |
| JP | 2001-184158 A | 7/2001 |
| JP | 3085481 | 2/2002 |
| JP | 2002-215311 | 8/2002 |
| JP | 2003/015796 | 1/2003 |
| JP | 2003-060754 | 2/2003 |
| JP | 2003/099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 2007-123473 | 5/2007 |
| KR | 1998-71394 A1 | 10/1998 |
| KR | 1999-50198 A1 | 7/1999 |
| KR | 2000-8579 A1 | 2/2000 |
| KR | 2001-0052016 A | 6/2001 |
| KR | 2001-0108361 A | 12/2001 |
| KR | 2002-0065059 A | 8/2002 |
| KR | 2006-0021678 A | 3/2006 |
| TW | 431607 | 4/2001 |
| TW | 470193 | 12/2001 |
| TW | 547716 | 8/2003 |
| TW | I220491 | 8/2004 |
| WO | WO 94/17494 | 8/1994 |
| WO | WO 95/00897 | 1/1995 |
| WO | WO 96/27968 | 9/1996 |
| WO | WO 98/14863 | 4/1998 |
| WO | WO 99/49443 | 9/1999 |
| WO | WO 01/02949 A1 | 1/2001 |
| WO | WO 01/44912 A2 | 6/2001 |
| WO | WO 02/08881 A2 | 1/2002 |
| WO | WO 03/036457 A2 | 5/2003 |
| WO | WO 03/044645 A1 | 5/2003 |
| WO | WO 03/044956 A2 | 5/2003 |
| WO | WO 03/025960 A1 | 9/2003 |
| WO | WO 03/088176 A1 | 10/2003 |
| WO | WO 03/090008 A2 | 10/2003 |
| WO | WO 2004/001573 A2 | 12/2003 |
| WO | WO 2004/040606 A2 | 5/2004 |
| WO | WO 2004/091956 A2 | 10/2004 |
| WO | WO 2005/055620 A2 | 6/2005 |
| WO | WO 2005/076117 A1 | 8/2005 |
| WO | WO 2005/114369 A2 | 12/2005 |
| WO | WO 2005/124526 A2 | 12/2005 |
| WO | WO 2006/020305 A2 | 2/2006 |
| WO | WO 2006/021211 A2 | 3/2006 |
| WO | WO 2006/037545 A2 | 4/2006 |
| WO | WO 2006/104745 A2 | 10/2006 |
| WO | WO 2006/135127 A1 | 12/2006 |
| WO | WO 2007/025858 A1 | 3/2007 |
| WO | WO 2007/078477 A1 | 7/2007 |
| WO | WO 2007/084467 A2 | 7/2007 |
| WO | WO 2007/089766 A2 | 8/2007 |
| WO | WO 2008/007372 A2 | 1/2008 |
| WO | WO 2008/045414 A1 | 4/2008 |
| WO | WO 2008/045833 A1 | 4/2008 |
| WO | WO 00/79772 A1 | 12/2009 |

OTHER PUBLICATIONS

3D Connexion, "Product Overview—SpaceMouse Classic", www.logicad3d.com/products/classics.htm, downloaded Apr. 8, 2002, 2 pages.
3DConnexion, "About Quicktip®," www.logicad3d.com/docs/qt.html, Apr. 8, 2002, 2 pages.
Ahl, "Controller Update", Creative Computing, vol. 9, No. 12, Dec. 1983, 6 pages.
Ahmad, "A Usable Real-Time 3D Hand Tracker," Proceedings of the 28th Asilomar Conference on Signals, Systems and Computers, Oct. 1994, 5 pages.
Alps Electric (USA) Inc., Alps Electric Introduces the GlidePoint Wave Keyboard; combines a gently curved design with Alps, advanced GlidePoint technology, Business Wire, Oct. 21, 1996, 3 pages.
Alps Electric (USA) Inc., Alps Electric Ships GlidePoint Keyboard for the Macintosh; Includes a GlidePoint Touchpad, Erase-Eaze Backspace Key and Contoured Wrist Rest, Business Wire, Jul. 1, 1996, 2 pages.
Apple Store, "Apple Presents iPod Ultra-Portable MP3 Music Player Puts 1,000 Songs in Your Pocket", http://www.apple.com/pr/library/2001/10/23Apple-Presents-iPod.html, Oct. 23, 2001, 3 pages.
"APS Show Guide to Exhibitors", Physics Today, vol. 49, No. 3, Cervantes Convention Center, St. Louis, Missouri, Mar. 1996, 13 pages.
Apple Computer, Inc., "Apple Unveils Optical Mouse and New Pro Keyboard," http://www.apple.com/ca/press/2000/07/mouse.html, Press Release, Jul. 19, 2000, 2 pages.
Atari, "Atari VCS/2600 Peripherals", http://www.classicgaming.com/gamingmuseum/2600p.html, Feb. 28, 2007, 15 pages.
Baig, "Your PC Just Might Need a Mouse," U.S. News & World Report, vol. 108, Issue 22, Jun. 4, 1990, 4 pages.
Bang & Olufsen Telecom a/s, "BeoCom 6000 User Guide 2000," Denmark, Sep. 17, 2009, 54 pages.
Bartimo, "The Portables: Traveling Quickly", Computerworld, Nov. 14, 1983, 6 pages.
Beijing Acer Information Co. Ltd., "Touchpad," Notebook PC Manual, Feb. 16, 2005, 3 pages.
BeoCom 6000, Sales Training Brochure, date unknown, 5 pages.
Bray, "Phosphors Help Switch on Xenon," PhysicsWorld/Physicsweb, Apr. 1999, 3 pages.
Brink et al., "Red-Flagging Antihistamines; Pumped-Up Portables, Debts Silver Lining; Easing Aching Hearts", U.S. News & World Report, May 30, 1994, 2 pages.
Boling, "Programming Microsoft Windows ce.net, Third Edition," May 28, 2003, 3 pages.
Buxton et al., "Issues and Techniques in Touch-Sensitive Tablet Input", Computer Systems Research Institute, University of Toronto, Toronto, Ontario, Canada, Jul. 1, 1985, 10 pages.
Chapweske, "PS/2 Mouse/Keyboard Protocol", http://www.Computer-Engineering.org, May 9, 2003, 7 pages.
Chen et al., "A Study in Interactive 3-D Rotation Using 2-D Control Devices," Department of Electrical Engineering/Dynamic Graphics Project, University of Toronto, Aug. 1, 1988, 9 pages.
DevSys—Heatseekerz.net, "Crystal Optical Mouse," http//www.heatseekers.net/index/php?page=articles&id=19&pagenum=3, Feb. 14, 2002, 2 pages.
Design News, A Cahners Publication, National Design Engineering Show Conference, McCormick Place, Chicago, Mar. 18-21, 1996, 87 pages.
Design News, A Cahners Publication, "Literature Plus", Dec. 18, 1995, 30 pages.
Design News, A Cahners Publication, "Product News", www.designnews.com, May 5, 1997, 56 pages.
Design News, A Cahners Publication, "Product News", www.designnews.com, Jun. 9, 1997, 34 pages.
Digital Innovations, LLC "Neuros MP3 Digital Audio Computer", www.neurosaudio.com, download Apr. 9, 2003, 6 pages.
EBV Electronic, "TSOP6238 IR Receiver Modules for Infrared Remote Control Systems," Jan. 2004, 1 page.
Evans et al., "Tablet-Based Valuators that Provide One, Two, or Three Degrees of Freedom", National Research Councel of Canada, Ottawa, Ontario, Aug. 3, 1981, 7 pages.
Fiore, Andrew, "Zen Touchpad", Cornell University, May 2000, 6 pages.

(56) References Cited

OTHER PUBLICATIONS

Gadgetboy, "Point and Click With the Latest Mice", CNETAsia Product Reviews, www.asia.cnet/com/reviews, Oct. 10, 2001,1 page.
Gfroerer, "Photoluminescence in Analysis of Surfaces and Interfaces," Encyclopedia of Analytical Chemistry, John Wiley & Sons Ltd, Chichester, 2000, Published online Sep. 15, 2006, 24 pages.
Gillespie, "Synaptics Touch Pad Interfacting Guide" Second Edition, Mar. 25, 1998, Synaptics, Inc., San Jose, California, 91 pages.
Harmony Central, "Diamond Multimedia Announces Rio PMP300 Portable MP3 Music Player," Press Release, Sep. 14, 1998, 4 pages.
Information Access Company, a Thomson Corporation Company, "Triax Custom Controllers Due; Video Game Controllers," vol. 67, No. 1, p. 122, HFD—The Weekly Home Furnishings Newspaper, Jan. 4, 1993, 2 pages.
Interlink Electronics, VersaPad: Integration Guide, www.interlinkelectronics.com, Feb. 27, 2001, 35 pages.
Jesitus, "Broken Promises? FoxMeyer's Project," Penton/IPC Industry Week, Nov. 3, 1997, 6 pages.
Kobayashi et al., "Design of Dynamic Soundscape: Mapping Time to Space for Audio Browsing with Simultaneous Listening," Massachusetts Institute of Technology, Sep. 1996, 60 pages.
Kobayashi et al., "Development of the Touch Switches with the Click Response," Japan Aviation Electronics Industry, Ltd.; Translation of Summary, Mar. 1994, 5 pages.
Kobayashi et al., "Dynamic Soundscape: Mapping Time to Space for Audio Browsing," Speech Inteface Group, MIT Media Library, Cambridge, MA, Mar. 22-27, 1997, 8 pages.
Luna Technologies Inernational, Inc., "Photoluminescent Safety Products," http://www.lunaplast.com/photoluminescence.com, Dec. 27, 2005, 1 page.
Marriott et al., "Touch Pad for Handheld Device," U.S. Appl. No. 10/722,948, filed Nov. 25, 2003, 49 pages.
Mims, "A Few Quick Pointers; Mouses, Touch Screens, Touch Pads, Light Pads, and the Like Can Make Your System Easier to Use," Computers & Electronics, vol. 22, p. 64, May 1984, 6 pages.
Nass, "Touchpad Input Device Goes Digital to Give Portable Systems a Desktop 'Mouse-Like' Feel", Penton Publishing Inc., Electronic Design, vol. 44, No. 18, Sep. 3, 1996, 2 pages.
Nixon Peabody LLP, Attorneys at Law, Letter sent to Mr. Richard Liu, re: Bang & Olufsen A/S—Apple U.S. Patent Application No. 2003/0095096, May 21, 2004, 2 pages.
Cirque Corporation, OEM Touchpad Modules, http://www.glidepoint.com/sales/moduels/index.shtml, Feb. 13, 2002, 5 pages.
Office Action, dated Mar. 4, 2004, received in U.S. Appl. No. 10/188,182, 8 pages.
Office Action, dated Jul. 30, 2004, received in U.S. Appl. No. 10/188,182, 8 pages.
Office Action, dated Sep. 30, 2004, received in U.S. Appl. No. 10/259,159, 14 pages.
Office Action, dated Jun. 16, 2005, received in U.S. Appl. No. 10/259,159, 16 pages.
Office Action, dated Sep. 21, 2005, received in U.S. Appl. No. 10/188,182, 18 pages.
Office Action, dated Jan. 11, 2006, received in U.S. Appl. No. 10/259,159, 15 pages.
Office Action, dated Jun. 2, 2006, received in U.S. Appl. No. 10/722,948, 12 pages.
Office Action, dated Aug. 3, 2006, received in U.S. Appl. No. 10/259,159, 15 pages.
Office Action, dated Oct. 13, 2006, received in U.S. Appl. No. 10/259,159, 18 pages.
Office Action, dated Oct. 27, 2006, received in U.S. Appl. No. 10/643,256, 14 pages.
Office Action, dated Dec. 12, 2006, received in U.S. Appl. No. 10/722,948, 14 pages.
Office Action, dated Dec. 29, 2006, received in Chinese Patent Application No. 200510103886.3, 3 pages.
Office Action, dated Jan. 18, 2007, received in U.S. Appl. No. 10/259,159, 18 pages.
Office Action, dated Mar. 23, 2007, received in U.S. Appl. No. 10/643,256, 11 pages.
Office Action, dated Jul. 13, 2007, received in U.S. Appl. No. 10/643,256, 13 pages.
Office Action, dated Jul. 13, 2007, received in U.S. Appl. No. 10/722,948, 15 pages.
Office Action, dated Oct. 4, 2007, received in U.S. Appl. No. 11/386,238, 12 pages.
Office Action, dated Oct. 4, 2007, received in U.S. Appl. No. 11/806,957, 14 pages.
Office Action, dated Nov. 20, 2007, received in U.S. Appl. No. 11/057,050, 33 pages.
Office Action, dated Dec. 12, 2007, received in U.S. Appl. No. 10/643,256, 11 pages.
Office Action, dated Jan. 30, 2008, received in U.S. Appl. No. 10/722,948, 17 pages.
Office Action, dated Jul. 9, 2008, received in U.S. Appl. No. 10/643,256, 12 pages.
Office Action, dated Aug. 19, 2008, received in U.S. Appl. No. 11/057,050, 23 pages.
Office Action, dated Sep. 17, 2008, received in U.S. Appl. No. 11/203,692, 8 pages.
Office Action, dated Nov. 26, 2008, received in U.S. Appl. No. 11/057,050, 25 pages.
Office Action, dated Dec. 24, 2008, received in U.S. Appl. No. 11/057,050, 25 pages.
Office Action, dated Jan. 26, 2009, received in U.S. Appl. No. 11/355,022, 15 pages.
Office Action, dated Jan. 27, 2009, received in U.S. Appl. No. 11/882,421, 15 pages.
Office Action, dated Feb. 20, 2009, received in U.S. Appl. No. 11/057,050, 25 pages.
Office Action, dated Feb. 23, 2009, received in U.S. Appl. No. 11/203,692, 13 pages.
Office Action, dated Mar. 5, 2009, received in U.S. Appl. No. 11/477,469, 12 pages.
Office Action, dated Jun. 25, 2009, received in U.S. Appl. No. 11/355,022, 18 pages.
Office Action, dated Jul. 24, 2009, received in U.S. Appl. No. 11/483,008, 17 pages.
Office Action, dated Jul. 27, 2009, received in U.S. Appl. No. 11/882,420, 17 pages.
Office Action, dated Aug. 4, 2009, received in U.S. Appl. No. 11/203,692, 12 pages.
Office Action, dated Aug. 6, 2009, received in U.S. Appl. No. 11/057,050, 30 pages.
Office Action, dated Aug. 10, 2009, received in U.S. Appl. No. 11/610,376, 11 pages.
Office Action, dated Aug. 12, 2009, received in U.S. Appl. No. 11/610,384, 20 pages.
Office Action, dated Sep. 1, 2009, received in U.S. Appl. No. 11/482,286, 14 pages.
Office Action, dated Sep. 15, 2009, received in U.S. Appl. No. 11/530,807, 15 pages.
Office Action, dated Oct. 5, 2009, received in U.S. Appl. No. 11/499,360, 7 pages.
Office Action, dated Jan. 14, 2010, received in U.S. Appl. No. 11/394,493, 20 pages.
Office Action, dated Jan. 15, 2010, received in U.S. Appl. No. 11/882,423, 22 pages.
Office Action, dated Jan. 25, 2010, received in U.S. Appl. No. 11/482,286, 17 pages.
Office Action, dated Jan. 27, 2010, received in U.S. Appl. No. 11/499,360, 8 pages.
Office Action, dated Feb. 4, 2010, received in U.S. Appl. No. 11/477,469, 14 pages.
Office Action, dated Mar. 30, 2010, received in U.S. Appl. No. 11/592,679, 13 pages.
Office Action, dated Mar. 30, 2010, received in U.S. Appl. No. 11/483,008, 20 pages.
Office Action, dated Mar. 30, 2010, received in U.S. Appl. No. 11/203,692, 15 pages.

(56) References Cited

OTHER PUBLICATIONS

Office Action dated Jun. 4, 2010, received in U.S. Appl. No. 11/530,807, 15 pages.
Office Action dated Jun. 7, 2010, received in U.S. Appl. No. 11/856,530, 15 pages.
Office Action dated Jun. 9, 2010, received in U.S. Appl. No. 11/482,286, 21 pages.
Office Action dated Jun. 11, 2010, received in U.S. Appl. No. 11/203,692, 17 pages.
Office Action dated Jun. 22, 2010, received in U.S. Appl. No. 11/394,493, 14 pages.
Office Action dated Jun. 22, 2010, received in U.S. Appl. No. 11/878,132, 32 pages.
Office Action dated Jun. 22, 2010, received in U.S. Appl. No. 11/882,882, 33 pages.
Office Action dated Jun. 22, 2010, received in U.S. Appl. No. 11/882,890, 15 pages.
Office Action dated Jun. 22, 2010, received in U.S. Appl. No. 11/812,383, 21 pages.
Office Action dated Jun. 23, 2010, received in U.S. Appl. No. 11/812,384, 29 pages.
Office Action dated Jun. 23, 2010, received in U.S. Appl. No. 11/882,889, 13 pages.
Office Action dated Jun. 25, 2010, received in U.S. Appl. No. 11/842,724, 22 pages.
Office Action, dated Jul. 8, 2010, received in U.S. Appl. No. 11/882,423, 19 pages.
Office Action, dated Jul. 9, 2010, received in U.S. Appl. No. 11/849,801, 13 pages.
Office Action, dated Aug. 2, 2010, received in U.S. Appl. No. 11/882,004, 9 pages.
Office Action, dated Aug. 18, 2010, received in U.S. Appl. No. 11/882,424, 16 pages.
Office Action, dated Aug. 19, 2010, received in U.S. Appl. No. 11/882,422, 13 pages.
Office Action dated Sep. 16, 2010, received in U.S. Appl. No. 11/591,752, 14 pages.
Office Action dated Sep. 29, 2010, received in U.S. Appl. No. 11/882,003, 13 pages.
Office Action dated Oct. 1, 2010, received in U.S. Appl. No. 11/482,286, 28 pages.
Office Action dated Oct. 4, 2010, received in U.S. Appl. No. 11/057,050, 31 pages.
Office Action dated Oct. 13, 2010, received in U.S. Appl. No. 12/205,795, 23 pages.
Office Action dated Oct. 26, 2010, received in U.S. Appl. No. 11/882,423, 18 pages.
Office Action dated Oct. 27, 2010, received in U.S. Appl. No. 11/483,008, 23 pages.
Office Action dated Oct. 29, 2010, received in U.S. Appl. No. 11/838,845, 8 pages.
Office Action dated Nov. 16, 2010, received in U.S. Appl. No. 11/477,469, 13 pages.
Office Action dated Nov. 22, 2010, received in U.S. Appl. No. 11/203,692, 6 pages.
Office Action dated Dec. 3, 2010, received in U.S. Appl. No. 11/530,807, 17 pages.
Office Action dated Dec. 8, 2010, received in U.S. Appl. No. 11/482,286, 33 pages.
Office Action dated Dec. 9, 2010, received in U.S. Appl. No. 11/394,493, 13 pages.
Office Action dated Dec. 22, 2010, received in U.S. Appl. No. 11/882,427, 16 pages.
Office Action dated Jan. 7, 2011, received in U.S. Appl. No. 11/856,530, 13 pages.
Office Action dated Jan. 7, 2011, received in U.S. Appl. No. 12/205,795, 21 pages.
Office Action dated Feb. 1, 2011, received in U.S. Appl. No. 11/882,004, 16 pages.
Office Action dated Feb. 4, 2011, received in U.S. Appl. No. 11/849,801, 22 pages.
Office Action dated Feb. 17, 2011, received in U.S. Appl. No. 12/844,502, 11 pages.
Office Action dated Mar. 16, 2011, received in U.S. Appl. No. 11/882,003, 12 pages.
Office Action dated Mar. 21, 2011, received in U.S. Appl. No. 11/842,724, 29 pages.
Office Action dated Mar. 24, 2011, received in U.S. Appl. No. 11/591,752, 11 pages.
Office Action, dated Mar. 24, 2011, received in U.S. Appl. No. 12/205,757, 14 pages.
Office Action dated Mar. 31, 2011, received in U.S. Appl. No. 11/882,005, 7 pages.
Office Action dated Apr. 26, 2011, received in U.S. Appl. No. 11/838,845, 9 pages.
Perenson, "New & Improved, News of Announced Products and Upgrades", PC Magazine, Sep. 10, 1996, 2 pages.
Petersen, "Koala Touch Tablet & Micro Illustrator Software," InfoWorld, Oct. 10, 1983, 3 pages.
Petruzzellis, "Force-Sensing Resistors" Electronics Now, vol. 64, Issue 3, Mar. 1993, 8 pages.
Photographs of Innovations 2000 Best of Show Award Presented at the 2000 International CES InNovations 2000 Design & Engineering Showcase, Jan. 6, 2000, 1 page.
Palazzolo, "Master System Service and Troubleshooting Manual," Intellivision, www.dsplib.com/intv/master, Dec. 12, 1997, 4 pages.
SanDisk, "Sansa Connect User Guide," Oct. 17, 2007, 29 pages.
Schramm, "Playing with the iPhone's Accelerometer," The Unofficial Apple Weblog, http://www.tuaw.com/2007/08/29/playing-with-the-iphones-accelerometer, Aug. 29, 2007, 5 pages.
Soderhoim, "Sensing Systems for 'Touch and Feel'," Design News, May 8, 1989, 6 pages.
Sony, "Sony Presents Choice Without Compromise" at IBC '97, M2 Presswire, Jul. 24, 1997, 3 pages.
Spiwak, "A Great New Wireless Keyboard", Popular Electronics, vol. 14, Issue 12, Dec. 1997, 8 pages.
Spiwak, "A Pair of Unusual Controllers", Popular Electronics, vol. 14, Issue 4, Apr. 1997, 7 pages.
Suzuki, "Full Loading of Usable Software! Strongest Palm Series Packs 1000," First Edition, Ascii Co., Ltd., Second Edition, 4 pages.
Sylvania, "Intellivision™ Intelligent Television Master Component Service Manual," DSPLIB Website—Mattel Intellivsion, dated Jun. 21, 2011, 24 pages.
Telefon, "Der Klangmeister," Connect Magazine, Aug. 1998, 2 pages.
Tessler, "Touchpads, Three New Input Devices", Macworld, www.macworld.com/1996/02/review/1806.html, Feb. 13, 2002, 2 pages.
Tessler, "Point Pad", Macworld, vol. 12, No. 10, Oct. 1995, 2 pages.
Tessler, "Smart Input: How to Choose From the New Generation of Innovative Inpute Devices", Macworld, vol. 13, No. 5, May 1996, 10 pages.
Tessler, "Touchpads", Alps Electronic, Macworld, vol. 13, No. 2, Feb. 1996, 4 pages.
The Laser Focus World Buyers Guide, "Manufactures," a PennWell Publication, Dec. 1995, 162 pages.
The News, "Previews of Exhibitor Booths at the Philadelphia show", Jan. 13, 1997, 22 pages.
Translation of Trekstor's Defense Statement to the District Court Mannheim, May 23, 2008, 37 pages.
Office Action, dated Sep. 30, 2004, received in U.S. Appl. No. 10/256,716, 11 pages.
Final Office Action, dated Jun. 24, 2005, received in U.S. Appl. No. 10/256,716, 12 pages.
Office Action, dated Jan. 10, 2006, received in U.S. Appl. No. 10/256,716, 12 pages.
Final Office Action, dated Aug. 3, 2006, received in U.S. Appl. No. 10/256,716, 15 pages.
Office Action, dated Oct. 13, 2006, received in U.S. Appl. No. 10/256,716, 16 pages.
Notice of Allowance, dated Jan. 25, 2007, received in U.S. Appl. No. 10/256,716, 4 pages.

(56) References Cited

OTHER PUBLICATIONS

Notice of Allowance, dated Jul. 16, 2007, received in U.S. Appl. No. 10/256,716, 4 pages.
Notice of Allowance, dated Nov. 1, 2007, received in U.S. Appl. No. 10,256,716, 4 pages.
Office Action, dated Jun. 9, 2006, received in Chinese Patent Application No. 02820867.6, which corresponds with U.S. Appl. No. 10/256,716, 4 pages.
Office Action, dated Jun. 20, 2008, received in Chinese Patent Application No. 200710090406.3, which corresponds with U.S. Appl. No. 10/256,716, 3 pages.
Office Action, dated Feb. 6, 2009, received in Chinese Patent Application No. 200710090406.3, which corresponds with U.S. Appl. No. 10/256,716, 3 pages.
Office Action, dated Aug. 7, 2009, received in Chinese Patent Application No. 200710090406.3, which corresponds with U.S. Appl. No. 10/256,716, 2 pages.
Office Action (Notification of Reexamination), dated Jul. 15, 2010, received in Chinese Patent Application No. 200710090406.3, which corresponds with U.S. Appl. No. 10/256,716, 4 pages.
Office Action, dated Nov. 30, 2011, received in Chinese Patent Application No. 200710090406.3, which corresponds with U.S. Appl. No. 10/256,716, 3 pages.
Office Action, dated Apr. 6, 2012, received in Chinese Patent Application No. 200710090406.3, which corresponds with U.S. Appl. No. 10/256,716, 3 pages.
Office Action, dated Aug. 21, 2009, received in Chinese Patent Application No. 200810008293.2, which corresponds with U.S. Appl. No. 10/256,716, 3 pages.
Office Action, dated Sep. 27, 2010, received in Chinese Patent Application No. 200810008293.2, which corresponds with U.S. Appl. No. 10/256,716, 3 pages.
Office Action, dated Apr. 13, 2006, received in European Patent Application No. 02 776 261.6, which corresponds with U.S. Appl. No. 10/256,716, 5 pages.
Office Action, dated Jun. 28, 2007, received in European Patent Application No. 02 776 261.6, which corresponds with U.S. Appl. No. 10/256,716, 5 pages.
Office Action, dated Oct. 2, 2008, received in European Patent Application No. 02 776 261.6, which corresponds with U.S. Appl. No. 10/256,716, 4 pages.
Office Action, dated Jun. 29, 2010, received in European Patent Application No. 02 776 261.6, which corresponds with U.S. Appl. No. 10/256,716, 4 pages.
Office Action (Observations by a Third Party), dated Nov. 3, 2008, received in European Application No. 02 776 261.6, which corresponds with U.S. Appl. No. 10/256,716, 11 pages.
Office Action (to Grant), dated Feb. 28, 2011, received in European Patent Application No. 02 776 261.6, which corresponds with U.S. Appl. No. 10/256,716, 5 pages.
Office Action, dated Mar. 8, 2012, received in European Patent Application No. 10 011 448.7, which corresponds with U.S. Appl. No. 10/256,716, 4 pages.
Office Action, dated Sep. 12, 2006, received in Japanese Patent Application No. 2003-538879, which corresponds with U.S. Appl. No. 10/256,716, 4 pages.
Official Inquiry from the Appeal Board, dated Sep. 22, 2008, received in Japanese Patent Application No. 2003-538879, which corresponds with U.S. Appl. No. 10/256,716, 5 pages.
Office Action, dated May 13, 2008, received in Japanese Patent Application No. 2007-057453, which corresponds with U.S. Appl. No. 10/256,716, 3 pages.
Office Action, dated Nov. 18, 2008, received in Japanese Patent Application No. 2008-179252, which corresponds with U.S. Appl. No. 10/256,716, 3 pages.
Office Action, dated Jun. 9, 2009, received in Japanese Patent Application No. 2008-179252, which corresponds with U.S. Appl. No. 10/256,716, 2 pages.
Office Action, dated Dec. 20, 2010, received in Japanese Patent Application No. 2008-179252, which corresponds with U.S. Appl. No. 10/256,716, 4 pages.
Office Action, dated Sep. 26, 2011, received in Japanese Patent Application No. 2008-179252, which corresponds with U.S. Appl. No. 10/256,716, 14 pages.
Office Action, dated Feb. 10, 2009, received in Japanese Patent Application No. 2008-179261, which corresponds with U.S. Appl. No. 10/256,716, 3 pages.
Office Action, dated Nov. 17, 2009, received in Japanese Patent Application No. 2008-179261, which corresponds with U.S. Appl. No. 10/256,716, 2 pages.
Office Action, dated Aug. 2, 2010, received in Japanese Patent Application No. 2008-179261, which corresponds with U.S. Appl. No. 10/256,716, 1 page.
Office Action, dated Sep. 20, 2011, received in Japanese Patent Application No. 2008-291198, which corresonds with U.S. Appl. No. 10/256,716, 8 pages.
Office Action, dated Jan. 9, 2006, received in Korean Patent Application No. 10-2004-7005119, which corresponds with U.S. Appl. No. 10/256,716, 3 pages.
Office Action, dated Aug. 29, 2006, received in Korean Patent Application No. 10-2004-7005119, which corresponds with U.S. Appl. No. 10/256,716, 3 pages.
Office Action, dated Aug. 31, 2007, received in Korean Patent Application No. 10-2004-7005119, which corresponds with U.S. Appl. No. 10/256,716, 3 pages.
Office Action, dated Feb. 11, 2008, received in Korean Patent Application No. 10-2004-7005119, which corresponds with U.S. Appl. No. 10/256,716, 3 pages.
Office Action, dated Jul. 16, 2008, received in Korean Patent Application No. 10-2004-7005119, which corresponds with U.S. Appl. No. 10/256,716, 2 pages.
Office Action, dated Jan. 11, 2008, received in Korean Patent Application No. 10-2007-7012309, which corresponds with U.S. Appl. No. 10/256,716, 4 pages.
Office Action, dated Mar. 2, 2009, received in Korean Patent Application No. 10-2007-7012309, which corresponds with U.S. Appl. No. 10/256,716, 3 pages.
Office Action, dated Jun. 30, 2008, received in Korean Patent Application No. 10-2008-7000097, which corresponds with U.S. Appl. No. 10/256,716, 3 pages.
Office Action, dated Dec. 19, 2008, received in Korean Patent Application No. 10-2008-7000097, which corresponds with U.S. Appl. No. 10/256,716, 8 pages.
Office Action, dated Jul. 29, 2009, received in Korean Patent Application No. 10-2008-7000097, which corresponds with U.S. Appl. No. 10/256,716, 3 pages.
Notice of Allowance, dated Mar. 3, 2010, received in Korean Patent Application No. 10-2008-7000097, which corresponds with U.S. Appl. No. 10/256,716, 5 pages.
Office Action, dated Mar. 3, 2010, received in Korean Patent Application No. 10-2009-7024888, which corresponds with U.S. Appl. No. 10/256,716, 3 pages.
Office Action, dated Jul. 26, 2010, received in Korean Patent Application No. 10-2010-7014838, which corresponds with U.S. Appl. No. 10/256,716, 3 pages.
Certificate of Grant, dated Jan. 31, 2011, received in Singapore Patent Application No. 200701908-6, which corresponds with U.S. Appl. No. 10/256,716, 1 page.
Office Action, dated Apr. 6, 2011, received in Singapore Patent Application No. 200907980-7, which correponds with U.S. Appl. No. 10/256,716, 6 pages.
Certificate of Grant, dated May 6, 2014, received in Singapore Patent Application No. 2009079807, which corresponds with U.S. Appl. No. 10/256,716, 1 page.
Office Action, dated Aug. 7, 2009, received in U.S. Appl. No. 11/610,181, 20 pages.
Notice of Allowance, dated Jan. 14, 2010, received in U.S. Appl. No. 11/610,181, 7 pages.
Office Action, dated Jul. 7, 2009, received in U.S. Appl. No. 11/610,190, 26 pages.

(56) References Cited

OTHER PUBLICATIONS

Final Office Action, dated Dec. 31, 2009, received in U.S. Appl. No. 11/610,190, 25 pages.
Office Action, dated Apr. 28, 2010, received in U.S. Appl. No. 11/610,190, 29 pages.
Final Office Action, dated Aug. 6, 2010, received in U.S. Appl. No. 11/610,190, 30 pages.
Office Action, dated Apr. 19, 2011, received in U.S. Appl. No. 11/610,190, 25 pages.
Final Office Action, dated Sep. 20, 2011, received in U.S. Appl. No. 11/610,190, 27 pages.
Office Action, dated Mar. 14, 2012, received in U.S. Appl. No. 11/610,190, 26 pages.
Final Office Action, dated Dec. 6, 2012, received in U.S. Appl. No. 11/610,190, 25 pages.
Office Action dated Nov. 1, 2010, received in U.S. Appl. No. 11/959,918, 8 pages.
Office Action dated Mar. 31, 2011, received in U.S. Appl. No. 11/959,918, 9 pages.
Office Action, dated Mar. 3, 2014, received in U.S. Appl. No. 11/959,918, 9 pages.
Notice of Allowance, dated Nov. 24, 2014, received in U.S. Appl. No. 11/959,918, 7 pages.
Office Action, dated Oct. 26, 2010, received in U.S. Appl. No. 11/959,942, 27 pages.
Final Office Action, dated Jun. 23, 2011, received in U.S. Appl. No. 11/959,942, 30 pages.
Final Office Action, dated Mar. 21, 2012, received in U.S. Appl. No. 11/959,942, 23 pages.
Final Office Action, dated Sep. 28, 2012, received in U.S. Appl. No. 11/959,942, 26 pages.
Office Action, dated Jul. 15, 2014, received in U.S. Appl. No. 11/959,942, 20 pages.
Notice of Allowance, dated Dec. 5, 2014, received in U.S. Appl. No. 11/959,942, 8 pages.
Extended Search Report, dated Feb. 21, 2011, received in European Patent Application No. 10011448.7, which corresponds with U.S. Appl. No. 10/256,716, 8 pages.
Australian Search Report and Written Opinion, dated Aug. 20, 2008, received in Australian Patent Application No. SG 200701908-6, which corresponds with U.S. Appl. No. 10/256,716, 11 pages.
Australian Written Opinion, dated May 27, 2009, received in Australian Patent Application No. SG 200701908-6, which corresponds with U.S. Appl. No. 10/256,716, 5 pages.
Australian Written Opinion, dated Jan. 28, 2010, received in Australian Patent Application No. SG 200701908-6, which corresponds with U.S. Appl. No. 10/256,716, 5 pages.
Australian Search Report and Written Opinion, dated May 10, 2010, received in Australian Patent Application No. SG 200907980-7, which corresponds with U.S. Appl. No. 10/256,716, 9 pages.
International Search Report, dated Oct. 15, 2003, received in International Patent Application No. PCT/2002/033805, which corresponds with U.S. Appl. No. 10/256,716, 3 pages.

* cited by examiner

SCROLLING BASED ON ROTATIONAL MOVEMENT

CROSS-REFERENCE TO RELATED APPLICATIONS

This application is a continuation of U.S. application Ser. No. 11/959,942, filed Dec. 19, 2007, which is a divisional of U.S. application Ser. No. 10/256,716, filed Sep. 26, 2002, now U.S. Pat. No. 7,312,785, which are hereby incorporated by reference herein, and which claims benefit of priority from: (i) U.S. Provisional Patent Application No. 60/387,692, filed Jun. 10, 2002, and entitled "METHOD AND APPARATUS FOR USE OF ROTATIONAL USER INPUTS," which is hereby incorporated by reference herein; (ii) U.S. Provisional Patent Application No. 60/359,551, filed Feb. 25, 2002, and entitled "TOUCH PAD FOR HANDHELD DEVICE," which is hereby incorporated by reference herein; and (iii) U.S. Provisional Patent Application No. 60/346,237, filed Oct. 22, 2001, and entitled "METHOD AND SYSTEM FOR LIST SCROLLING," which is hereby incorporated by reference herein.

This application is related to U.S. patent application Ser. No. 10/072,765, filed Feb. 7, 2002, and entitled "MOUSE HAVING A ROTARY DIAL," now U.S. Pat. No. 7,084,856, which is hereby incorporated by reference herein. This application is also related to U.S. patent application Ser. No. 10/188,182, filed Jul. 1, 2002, and entitled "TOUCH PAD FOR HANDHELD DEVICE," now U.S. Pat. No. 7,046,230, which is incorporated by reference herein.

BACKGROUND OF THE INVENTION

Field of the Invention

The present invention relates generally to a computing device and, more particularly, to a handheld computing device having a rotational input unit.

Description of the Related Art

There exist today many styles of input devices for performing operations with respect to a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into consideration when designing the consumer electronic device. In handheld computing devices, the input devices are typically buttons and switches. Buttons and switches are generally mechanical in nature and provide limited control with regard to the movement of a cursor (or other selector) and the making of selections. For example, they are generally dedicated to moving the cursor in a specific direction (e.g., arrow keys) or to making specific selections (e.g., enter, delete, number, etc.). In the case of handheld personal digital assistants (PDAs), the input devices tend to utilize touch-sensitive display screens. When using a touch screen, a user makes a selection on the display screen by pointing directly to objects on the screen using a stylus or finger.

In portable computing devices such as laptop computers, the input devices are commonly touch pads. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases, a dedicated portion of the touch pad may be tapped. In stationary devices such as desktop computers, the input devices are generally selected from keyboards, mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackball devices generally include one or more buttons for making selections on the display screen.

In addition to allowing input pointer movements and selections with respect to a Graphical User Interface (GUI) presented on a display screen, the input devices may also allow a user to scroll across the display screen in the horizontal or vertical directions. For example, a mouse may include a scroll wheel that allows a user to simply roll the scroll wheel forward or backward to perform a scrolling action. In addition, touch pads may provide dedicated active areas that implement scrolling when the user passes his or her finger linearly across the active area in the x and y directions. Both devices may also implement scrolling via horizontal and vertical scroll bars that are displayed as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

Further, consumer electronic products other than computers, such as cordless telephones, stereo receivers and compact-disc (CD) players, have used dials to enable users to select a phone number, a radio frequency and a specific CD, respectively. Here, typically, a limited-resolution display is used together with the dial. The display, at best, displays only a single item (number, frequency or label) in a low resolution manner using a character generator LCD. In other words, these devices have used single line, low resolution LCD readouts.

Thus, there is always a need for improved user input devices that facilitate greater ease of use of computing devices.

SUMMARY OF THE INVENTION

The present invention relates to improved approaches for users of computing devices to interact with graphical user interfaces. A rotational user action supplied by a user via a user input device can provide accelerated scrolling. The accelerated nature of the scrolling enables users to scroll or traverse a lengthy data set (e.g., list of items) faster and with greater ease. The amount of acceleration provided can be performed in successive stages, and/or performed based on the speed of the rotational user action. In one embodiment, the rotational user action is transformed into linear action with respect to a graphical user interface. The resulting acceleration effect causes the linear action to be enhanced such that a lengthy data set is able to be rapidly traversed. Other aspects and features of the invention will become apparent below. Although the type of computing device can vary, the invention is particularly well-suited for use with a media player.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention relates to improved approaches for users of computing devices to interact with graphical user interfaces. A rotational user action supplied by a user via a user input device can provide accelerated scrolling. The accelerated nature of the scrolling enables users to scroll or traverse a lengthy data set (e.g., list of items) faster and with greater ease. The amount of acceleration provided can be performed in successive stages, and/or performed based on the speed of the rotational user action. In one embodiment, the rotational user action is transformed into linear action with respect to a graphical user interface. The resulting acceleration effect causes the linear action to be enhanced such that a lengthy data set is able to be rapidly traversed. Other aspects and features of the invention will become apparent below. Although the type of computing device can vary, the invention is particularly well-suited for use with a media player.

Embodiments of the invention are discussed below with reference to FIGS. 1-12. However, those skilled in the art will readily appreciate that the detailed description given herein with respect to these figures is for explanatory purposes as the invention extends beyond these limited embodiments.

Figure 1:
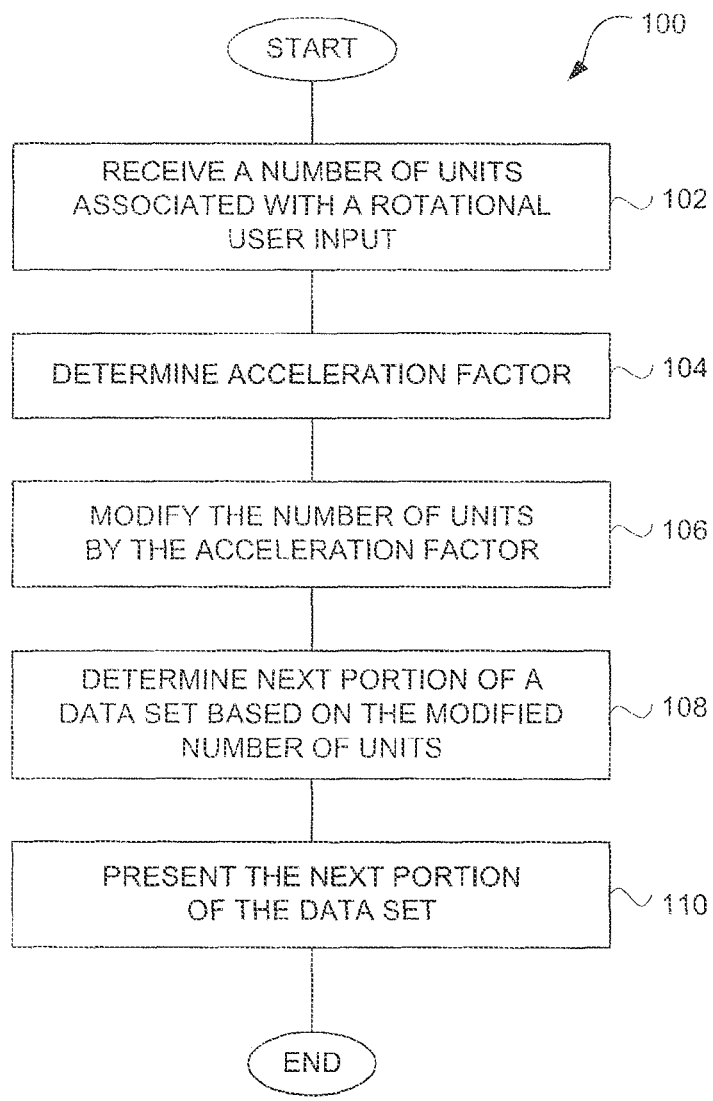
FIG. 1 is a flow diagram of scroll processing according to one embodiment of the invention.

FIG. 1 is a flow diagram of scroll processing 100 according to one embodiment of the invention. The scroll processing 100 assists a user in scrolling through a data set. The scroll processing 100 initially receives 102 a number of units associated with a rotational user input. The number of units is an indication of an amount of rotational movement a user has invoked with respect to a rotational input device.

Next, an acceleration factor is determined 104. The acceleration factor is an indication of the degree of acceleration to be utilized with the scroll processing 100. After the acceleration factor is determined 104, the number of units that are associated with the rotational user input is modified 106 by the acceleration factor. In one embodiment, the number of units is modified by multiplication with the acceleration factor. In various other embodiments, the number of units can be modified in various other ways.

After the number of units has been modified 106, a next portion of the data set that is being scrolled through can be determined 108 based on the modified number of units. Once the next portion has been determined 108, the next portion of the data set can be presented 110. Typically, the next portion of the data set associated with the scroll processing 100 is presented 110 to the user that caused the rotational user input. In one embodiment, the next portion of the data set can be presented 110 to the user by displaying the next portion of the data set on a display device. In another embodiment of the invention, the next portion of the data set can be presented 110 to the user by displaying the next portion of the data set with at least one item distinctively or distinguishly displayed (e.g., highlighted) from the other items. In still another embodiment, the next portion of the data set can be presented 110 to the user by playing or executing a file. After the next portion of the data set has been presented 110, the scroll processing 100 is complete and ends. However, the scroll processing 100 will repeat for each rotational user input.

Here, the faster the rate of rotational user input, the further down a list the next item becomes. It should be noted that the rate of rotational user input can be relative or absolute in nature. Still further, the rate of rotational user input need not be an actual velocity value, but could be a count or other value that is proportional to or influenced by the rate of rotational user input.

A data set as used herein pertains to a set of data. As one example, the data set can be a list of items (e.g., a list of songs). As another example, the data set can be a media file (e.g., MP3 or other audio file, video file, or image file). In one embodiment, the data set can be considered a sequential data set because the data within the set is often sequential. For example, the songs in a list are arranged sequentially and the data within an audio file are also arranged sequentially.

Figure 2:
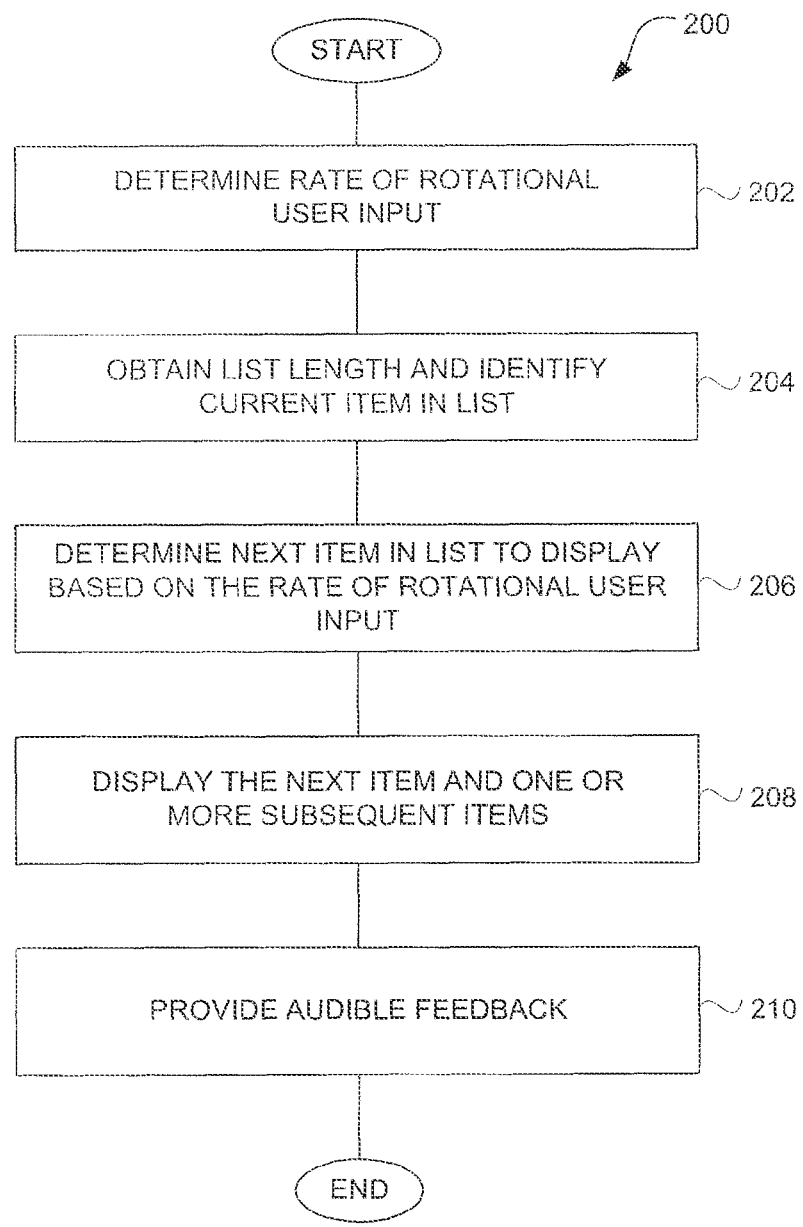
FIG. 2 is a flow diagram of list navigation processing according to another embodiment of the invention.

FIG. 2 is a flow diagram of list navigation processing 200 according to another embodiment of the invention. The list navigation processing 200 initially determines 202 a rate of rotational user input (e.g., dial turn). The rotational user input is provided through user interaction with a rotational input device. A list length is then obtained 204 and a current item in the list is identified. Typically, the current item is the item in the list that is being displayed. In one embodiment, the current item is highlighted such that it is distinctively displayed from other items of the list that are simultaneously displayed.

A next item in the list to be displayed is then determined 206 based on the rotational user input. The determination 206 of the next item in the list can also be dependent on the list length and the current item in the list. For example, the greater the rate of the rotational user input, the further apart the next item is from the current item in the list. The rate of the rotational user input and the length of the list can affect whether acceleration (e.g., acceleration factor) is provided for navigating the list. Thereafter, the list navigation processing 200 displays 208 a next item and one or more subsequent (or neighboring) items thereto. For example, the next item and the one or more subsequent items can be displayed 208 by a display screen produced by a display device. Additionally, the list navigation processing 200 can provide 210 an audio feedback. The audio feedback provides an audible sound that indicates feedback to the user as to the rate at which the items in the list are being traversed. The audible feedback can thus also be proportional to the rate of rotational user input.

Figure 3:
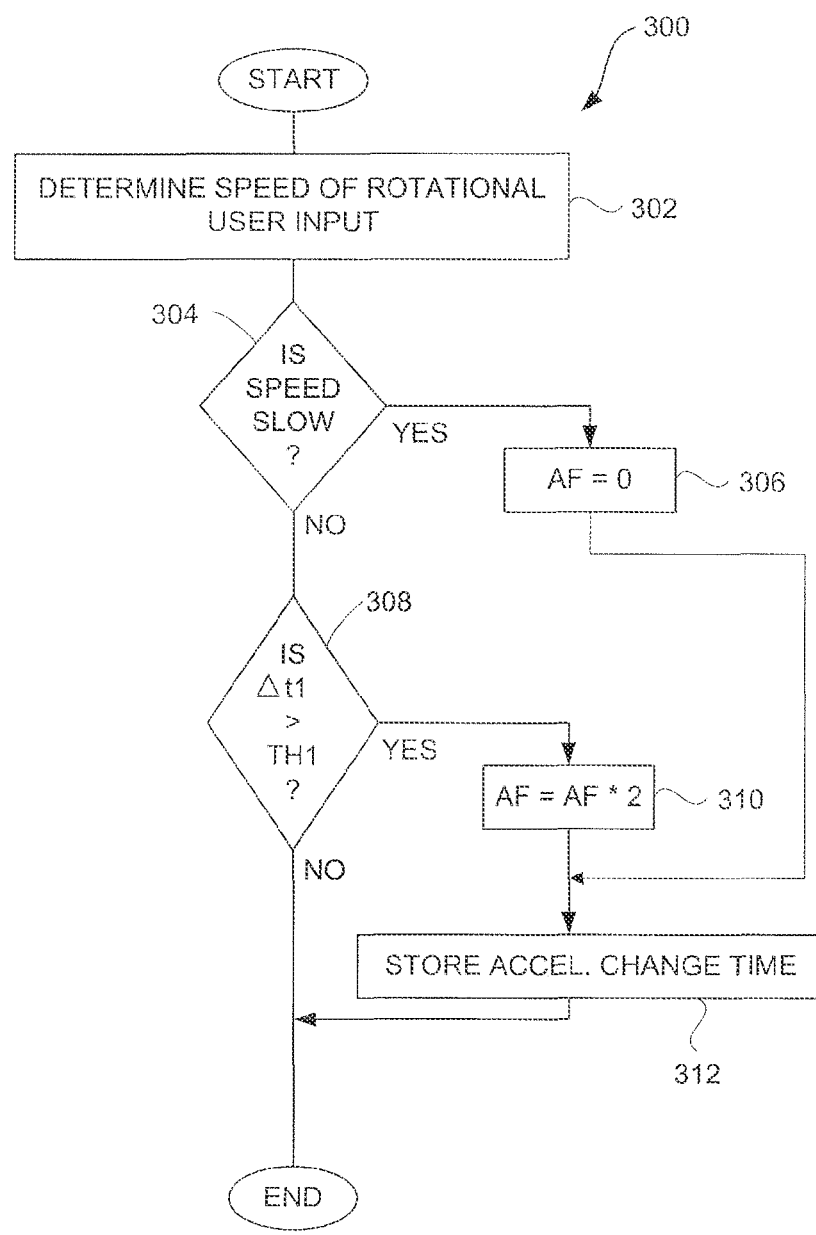
FIG. 3 is a flow diagram of acceleration amount processing according to one embodiment of the invention.

FIG. 3 is a flow diagram of acceleration amount processing 300 according to one embodiment of the invention. The acceleration amount processing 300 is, for example, processing that can be performed to determine an acceleration factor. In one embodiment, the acceleration amount processing 300 is, for example, suitable for use as the operation 104 illustrated in FIG. 1. In another embodiment, the acceleration amount processing 300 is, for example, suitable for use as a sub-operation for the operation 206 illustrated in FIG. 2.

The acceleration amount processing 300 initially determines 302 a speed of a rotational user input. As previously noted with respect to FIG. 1, the rotational user input is provided by a rotational input device that is interacted with by a user. In one embodiment, the speed of the rotational user input is determined 302 based on the number of rotational units identified by the rotational user input. More particularly, in another embodiment, the speed of the rotational user input is determined 302 based on the number of rotational units and an amount of time over which such rotational inputs were received. The speed of the rotational user input can, for example, be considered to be the speed of a user movement or the speed of rotation of a rotational input device.

After the speed of the rotational user input has been determined 302, a decision 304 determines whether the speed of the rotational user input is slow. The speed of the rotational user input can be determined or estimated, directly or indirectly, in a variety of ways. In one embodiment, a threshold is used to distinguish between slow and fast speeds of the rotational user input. The precise rate of rotation that is deemed to be the threshold between slow and fast can vary with application. The threshold can be determined experimentally based upon the particular application for which the acceleration amount processing 300 is utilized.

Once the decision 304 determines that the speed of the rotational user input is slow, then the acceleration factor (AF) is set 306 to zero (0). On the other hand, when the decision 304 determines that the speed of the rotational user input is not slow (i.e., the speed is fast), then a decision 308 determines whether an amount of time (At1) since the last time the acceleration was altered exceeds a first threshold (TH1). When the decision 308 determines that the amount of time (At1) since the last acceleration update is longer than the first threshold amount (TH1), then the acceleration factor is modified 310. In particular, in this embodiment, the modification 310 causes the acceleration factor to be doubled.

Following the operation 310, as well as following the operation 306, an acceleration change time is stored 312. The acceleration change time reflects the time that the acceleration factor was last updated. The acceleration change time is stored such that the decision 308 understands the amount of time since the acceleration was last modified (i.e., At1). Following the operation 312, as well as directly following the decision 308 when the amount of time since the last acceleration update was made is less than the first threshold (TH1), the acceleration amount processing 300 is complete and ends.

Hence, according to the acceleration amount processing 300, when the speed of the rotational user input is deemed slow, the acceleration factor is reset to zero (0), which indicates that no acceleration effect is imposed. On the other hand, when the speed of the rotational user input indicates that the speed of such rotation is fast, then the acceleration effect being imposed is doubled. In effect, then, if the user interacts with the rotational input device such that the speed of rotation is slow, then no acceleration effect is provided. In such case, the user can scroll through a data set (e.g., list, audio file) with high resolution. On the other hand, when the user interacts with the rotational input device with a high speed of rotation, then the acceleration effect is step-wise increased (e.g., via doubling or other means). The acceleration effect provided by the invention enables a user to interact with a rotational input device in an efficient, user-friendly manner such that long or extensive data sets can be scrolled through in a rapid manner.

Figure 4:
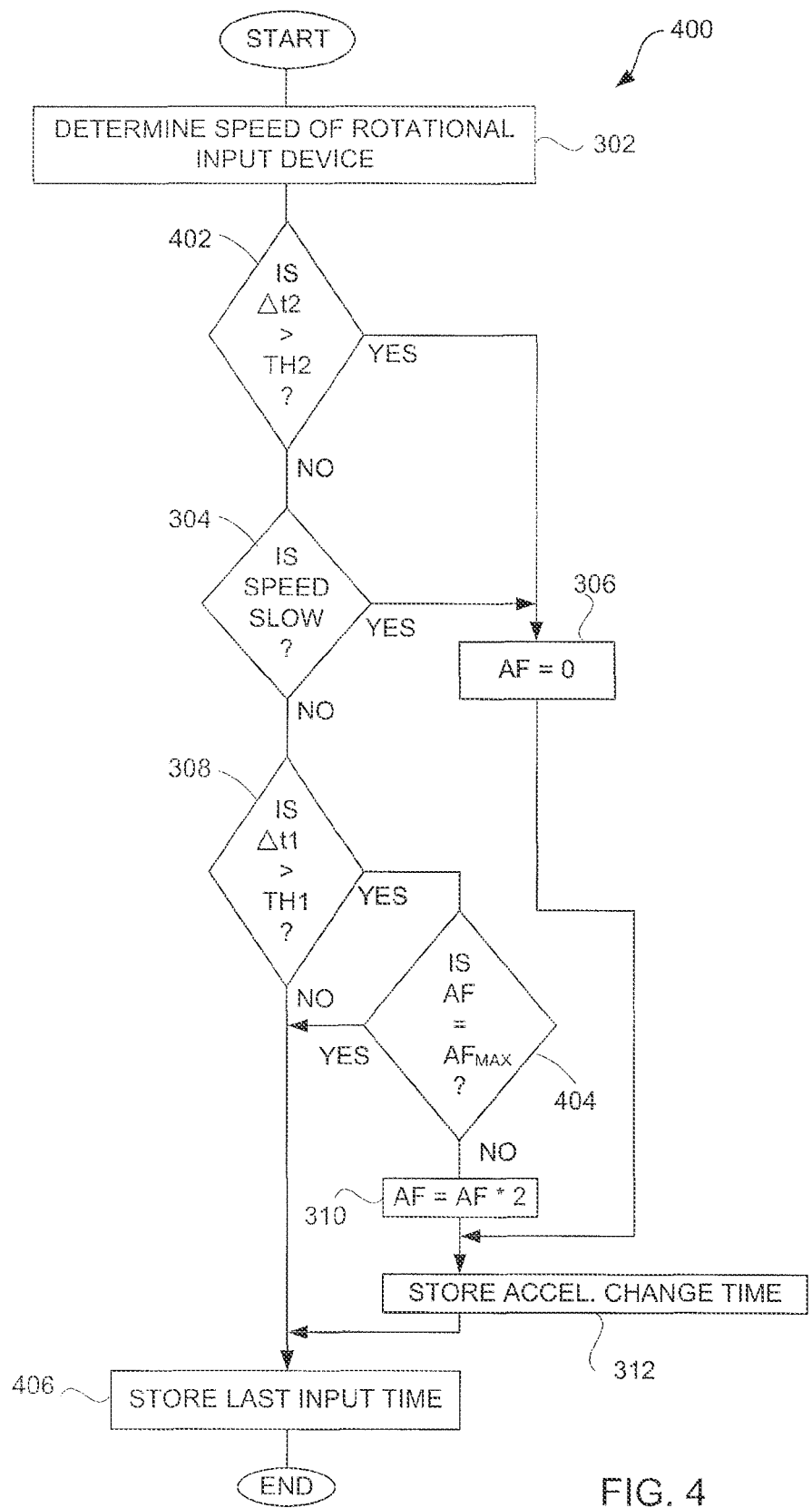
FIG. 4 is a flow diagram of acceleration amount processing according to another embodiment of the invention.

FIG. 4 is a flow diagram of acceleration amount processing 400 according to another embodiment of the invention. The acceleration amount processing 400 is generally similar to the acceleration amount processing 300 illustrated in FIG. 3. However, the acceleration amount processing 400 includes additional operations that can be optionally provided. More specifically, the acceleration amount processing 400 can utilize a decision 402 to determine whether a duration of time (At2) since the last rotational user input is greater than a second threshold (TH2). When the decision 402 determines that the duration of time (At2) since the last rotational user input exceeds the second threshold (TH2), then the acceleration factor is reset 306 to zero (0). Here, when the user has not provided a subsequent rotational user input for more than the duration of the second threshold (TH2), then the acceleration amount processing 400 is reset to no acceleration because it assumes that the user is restarting a scrolling operation and thus would not want to continue with a previous accelerated rate of scrolling.

The rate at which the acceleration effect is doubled is restricted such that the doubling (i.e., operation 310) can only occur at a rate below a maximum rate. The acceleration amount processing 400 also includes a decision 404 that determines whether the acceleration factor (AF) has reached a maximum acceleration factor (AFmAx). The decision 404 can be utilized to limit the maximum acceleration that can be imposed by the acceleration amount processing 400. For example, the acceleration factor (AF) could be limited to a factor of eight (8), representing that with maximum acceleration scrolling would occur at a rate eight (8) times faster than non-accelerated scrolling.

Still further, the acceleration amount processing 400 stores 406 a last input time. The last input time (t2) represents the time the last rotational user input was received (or processed). Note that the duration of time (At2) can be determined by the difference between a current time associated with an incoming rotational user input and the last input time (t2).

As previously noted, the acceleration amount processing 300, 400 is, for example, processing that can be performed to determine an acceleration factor. However, although not depicted in FIG. 3 or 4, when the length of the data set (e.g., list) is short, then the acceleration can be set to zero (i.e., no acceleration) and the acceleration amount processing 300, 400 can be bypassed. For example, in one embodiment, where the data set is a list, if the display screen can display only five (5) entries at a time, then the list can be deemed short if it does not include more than twenty (20) items. Consequently, according to another embodiment of the invention, the acceleration effect imposed by the invention can be dependent on the length of the data set (e.g., list).

The accelerated scrolling can also be depicted as a state machine having states representing different acceleration levels or different rates of acceleration. The particulars of such a state machine will vary widely with implementation.

Figure 5:
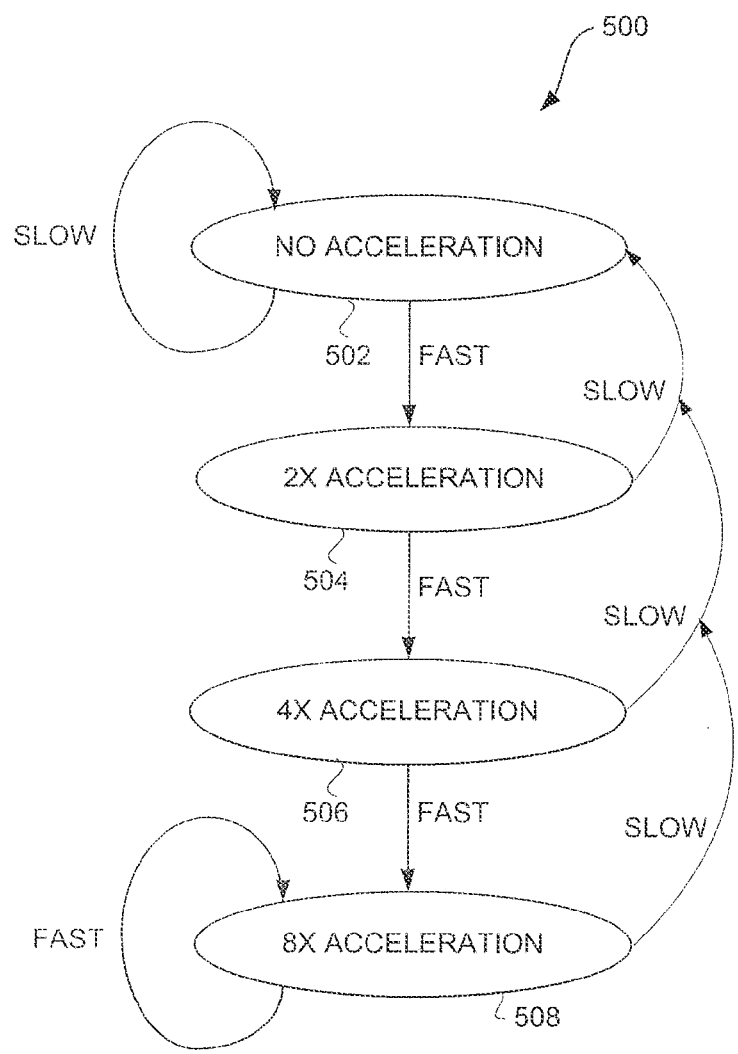
FIG. 5 is a representative acceleration state machine according to one embodiment of the invention.

FIG. 5 is a representative acceleration state machine 500 according to one embodiment of the invention. The acceleration state machine 500 has four states of acceleration. A first state 502 provides no acceleration. From the first state 502, when the speed of a next rotational user input is slow, the acceleration state machine 500 remains at the first state 502. Alternatively, when the speed of the rotational user input is fast, the acceleration state machine 500 transitions from a first state 502 to a second state 504. The second state 504 provides 2× acceleration, meaning that the resulting rate of scrolling would be twice that of the first state. When the acceleration state machine 500 is at the second state 504, when the speed of a next rotational user input is slow, the acceleration state machine 500 transitions back to the first state 502. Alternatively, when the speed of the next rotational user input is fast, the acceleration state machine 500 transitions from the second state 504 to a third state 506. The third state 506 provides 4× acceleration, meaning that the rate of scrolling would be four times that of the first state 502 or twice that of the second state 504. At the third state 506, when the speed of the next rotational user input is slow, the acceleration state machine 500 transitions from the third state 506 to the first state 502. Alternatively, when the speed of the next rotational user input is fast, the acceleration state machine 500 transitions from the third state 506 to a fourth state 508. At the fourth state 508, 8× acceleration is provided, meaning that the acceleration rate of scrolling is eight times that of the first state 502, four times that of the second state 504, or twice that of the third state 506. At the fourth state 508, when the speed of the next rotational user input is slow, the acceleration state machine 500 transitions from the fourth state 508 to the first state 502. Alternatively, when the speed of the next rotational user input is fast, the acceleration state machine 500 remains at the fourth state 508.

Figure 6:
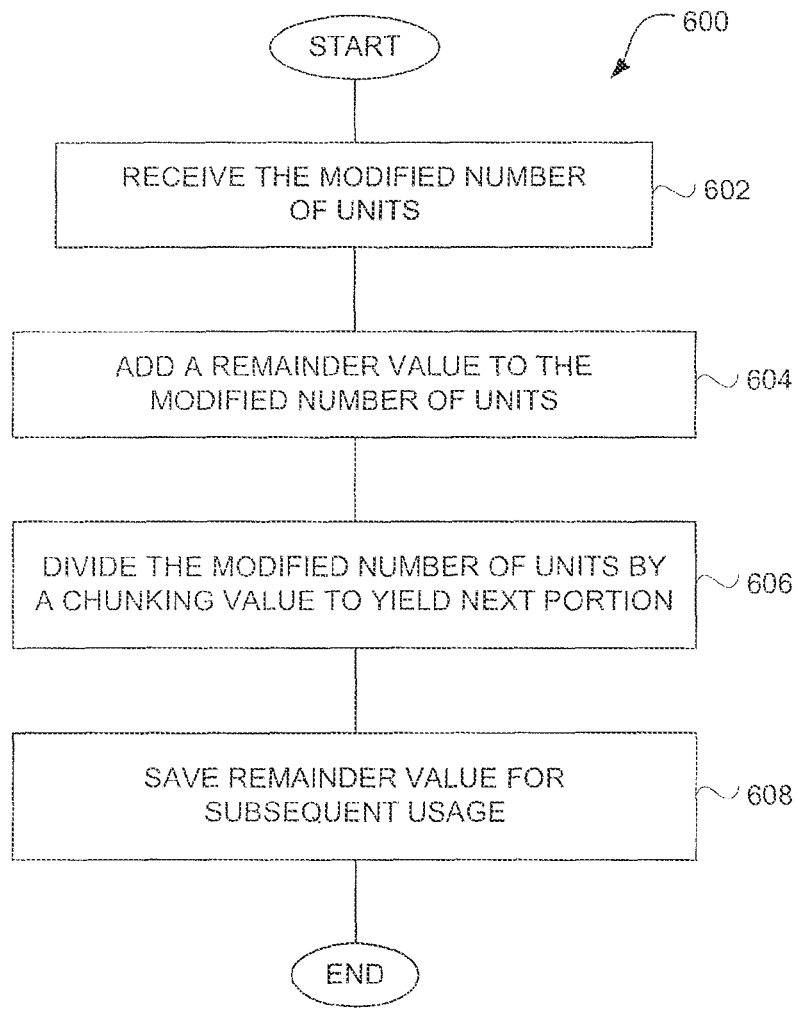
FIG. 6 is a flow diagram of next portion determination processing according to one embodiment of the invention.

FIG. 6 is a flow diagram of next portion determination processing 600 according to one embodiment of the invention. The next portion determination processing 600 is, for example, processing performed by the operation 108 illustrated in FIG. 1

The next portion determination processing 600 receives 602 the modified number of the units. For example, at operation 106 of FIG. 1, the number of units was modified 106 by the acceleration factor to determine the modified number of units. A remainder value is then added 604 to the modified number of units. The remainder value pertains to a previously determined remainder value as discussed below. Next, the modified number of units is divided 606 by a chunking value to view a next portion. The next portion is a subset of the data set that is eventually presented on a display device. For example, the next portion can pertain to one or more items in a list when the data set pertains to a list of items. In another example, the next portion can pertain to a segment or position in an audio file when the data set pertains to an audio file. In any case, the remainder value from the operation 606 is then saved 608 for subsequent usage in computing a subsequent next portion. Following the operation 608, the next portion determination processing 600 is complete and ends. Although the use of the remainder value is not necessary, the scrolling provided by the invention may be smoother to the user when the remainder is carried forward as described above.

As one example of the scroll processing according to the invention, consider the following exemplary case. Assume that the number of units associated with a rotational user input is 51 units. Also assume that an acceleration factor was determined to be 2. Hence, the modified number of units, according to one embodiment, would then be 102 units (51*2). In one implementation, a previous remainder value (if not stale) can be added to the modified number of units. Assume that the previous remainder value was 3, then the modified number of units becomes 105 (102+3). Thereafter, to determine the next portion of the data set, the modified number of units (105) is then divided by a chunking value (e.g., 5). Hence, the resulting value 20 indicates that the next portion of the data set to be presented (i.e., displayed on a display device) would be 20 items down (up) in the list from the current item.

The scroll, list navigation or acceleration amount processing discussed above can be utilized with respect to an audio player having a screen that displays a list of songs, or that provides a scroll bar indicating position of playing within an audio file. Typically, such an audio player typically displays different screens on the display. Each such screen can be individually scrolled through using separate position and acceleration values. Alternatively, the acceleration values can be shared across multiple different screens. Each such screen could be associated with a different list that is partially displayed on the screen, a portion of which is displayed on the screen at a time and, through scrolling, the portion can be altered in an accelerated manner. The file can be a list or represent a scroll bar reflecting play position in a song. Additional details of screens suitable for use with an audio player are described in U.S. Provisional Patent Application No. 60/399,806, filed on Jul. 30, 2002, which is hereby incorporated herein by reference.

Figure 7A:
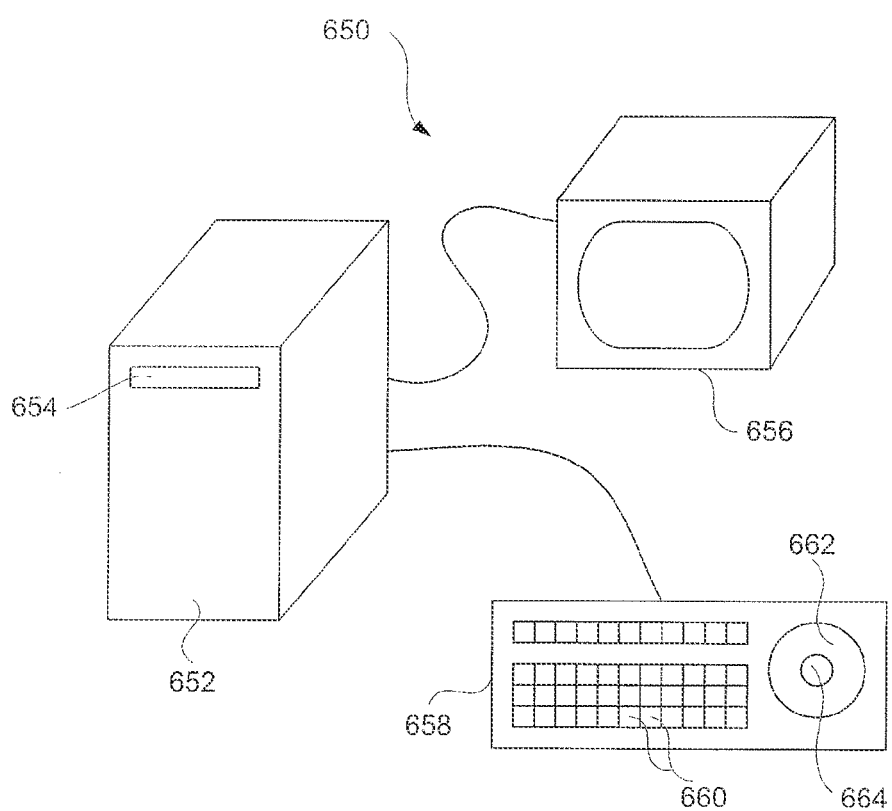
FIG. 7A is a perspective diagram of a computer system in accordance with one embodiment of the invention.

FIG. 7A is a perspective diagram of a computer system 650 in accordance with one embodiment of the invention. The computer system 650 includes a base housing 652 that encloses electronic circuitry that performs the computing operations for the computing system 650. Typically, the electronic circuitry includes a microprocessor, memory, I/O controller, graphics controller, etc. The housing 652 also provides a removable computer readable medium drive 654 in which a removable computer readable medium can be placed so as to electronically or optically read data therefrom. The computer housing 652 is also coupled to a display device 656 on which a screen display can be presented for a user of the computer system 650 to view. Still further, the computer system 650 includes a keyboard apparatus 658. The keyboard apparatus 658 allows a user to interact with a computer program (application program or operating system) performed by the computer system 650. In this regard, the keyboard apparatus 658 includes a plurality of keys 660 and a rotational input unit 662. The rotational input unit 662 allows a user to perform a rotational movement with respect to the rotational input unit 662. The rotational movement (rotational user input) can then be processed by the electronic circuitry of the computer system 650 and used to manipulate navigation or selection actions with respect to a graphical user interface being presented to the user on the display device 656. The keyboard apparatus 658 can also include a button 664 associated with the rotational input unit

662. As shown in FIG. 7A, the button 664 can be provided at a center region of the rotational input unit 662. However, the button 664 is not required and, if provided, can be placed elsewhere, such as outside the periphery of the rotational input unit 662.

Figure 7B:
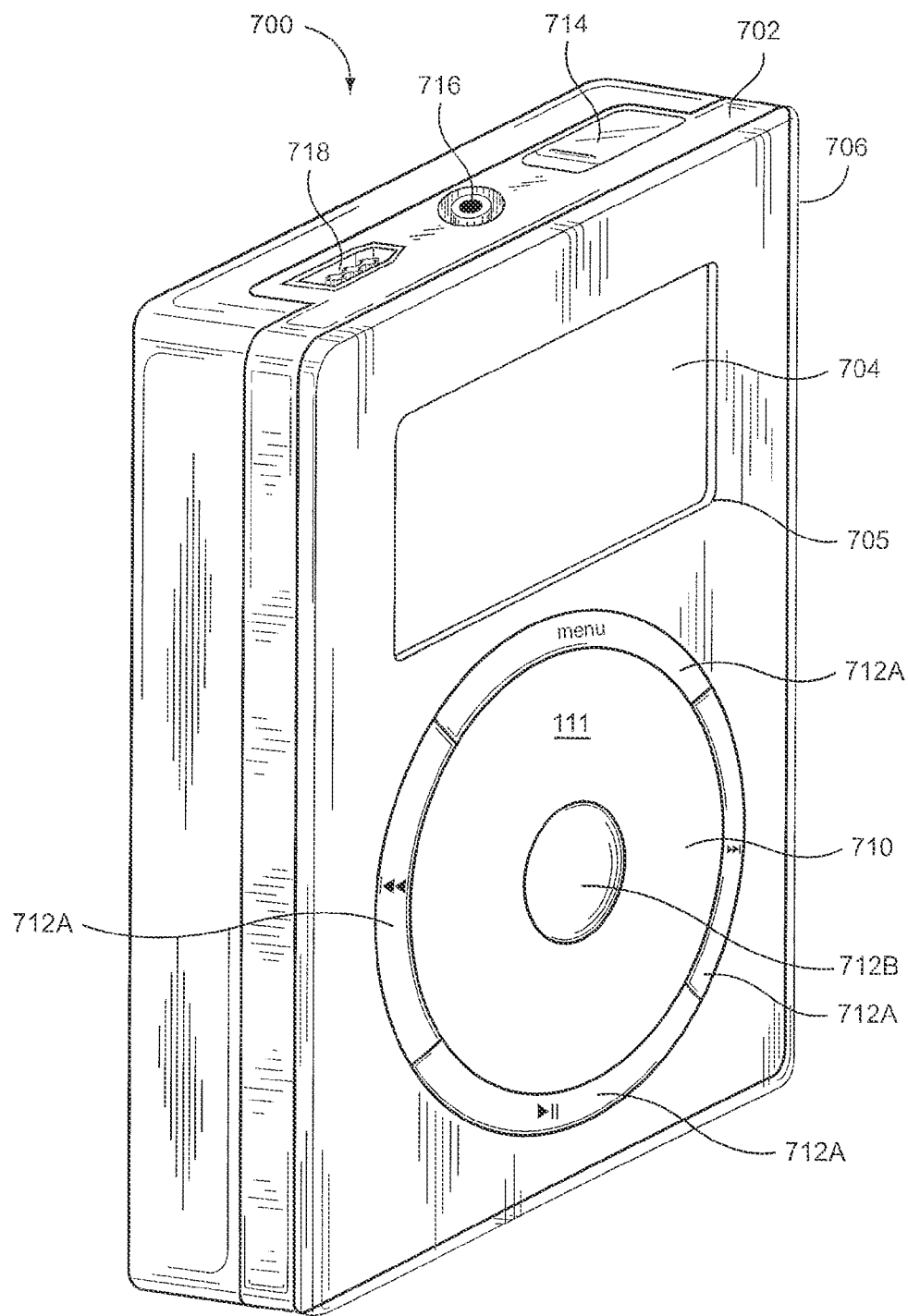
FIG. 7B is a perspective diagram of a media player in accordance with one embodiment of the present invention.

FIG. 7B is a perspective diagram of a media player 700 in accordance with one embodiment of the present invention. The term "media player" generally refers to computing devices that are dedicated to processing media such as audio, video or other images. In one implementation, the media player is a portable computing device. Examples of media players include music players, game players, video players, video recorders, cameras and the like. These computing devices are generally portable so as to allow a user to listen to music, play games or video, record video or take pictures wherever the user travels. In one embodiment, the media player is a handheld device that is sized for placement into a pocket of the user (i.e., pocket-sized). By being pocket-sized, the user does not have to directly carry the device and therefore the device can be taken almost anywhere the user travels (e.g., the user is not limited by carrying a large, bulky and often heavy device, as in a portable computer). For example, in the case of a music player (e.g., MP3 player), a user may use the device while working out at the gym. In the case of a camera, a user may use the device while mountain climbing. Furthermore, the device may be operated by the user's hands, no reference surface such as a desktop is needed. In one implementation, the music player can be pocket-sized and rather lightweight (e.g., dimensions of 2.43 by 4.02 by 0.78 inches and a weight of 6.5 ounces) for true portability.

The media player 700 typically has connection capabilities that allow a user to upload and download data to and from a host device such as a general purpose computer (e.g., desktop computer or portable computer). For example, in the case of a camera, photo images may be downloaded to the general purpose computer for further processing (e.g., printing). With regard to music players, songs and playlists stored on the general purpose computer may be downloaded into the music player. In one embodiment, the media player 700 can be a pocket-sized handheld MP3 music player that allows a user to store a large collection of music.

As shown in FIG. 7B, the media player 700 includes a housing 702 that encloses various electrical components (including integrated circuit chips and other circuitry) to provide computing capabilities for the media player 700. The integrated circuit chips and other circuitry may include a microprocessor, memory (e.g., ROM or RAM), a power source (e.g., a battery), a circuit board, a hard drive, and various input/output (I/O) support circuitry. In the case of music players, the electrical components may include components for outputting music such as an amplifier and a digital signal processor (DSP). In the case of video recorders or cameras, the electrical components may include components for capturing images such as image sensors (e.g., charge-coupled device (CCD) or complimentary oxide semiconductor (CMOS)) or optics (e.g., lenses, splitters, filters). The housing may also define the shape or form of the media player. That is, the contour of the housing 702 may embody the outward physical appearance of the media player 700.

The media player 700 also includes a display screen 704. The display screen 704 is used to display a Graphical User Interface (GUI) as well as other information to the user (e.g., text, objects, graphics). By way of example, the display screen 704 may be a liquid crystal display (LCD). In one particular embodiment, the display screen corresponds to a high-resolution display with a white LED backlight to give clear visibility in daylight as well as in low-light conditions. Additionally, according to one embodiment, the display screen 704 can be about 2 inches (measured diagonally) and provide a 160-by-128 pixel resolution. The display screen 704 can also operate to simultaneously display characters of multiple languages. As shown in FIG. 7B, the display screen 704 is visible to a user of the media player 700 through an opening 705 in the housing 702, and through a transparent wall 706 that is disposed over the opening 705. Although transparent, the transparent wall 706 may be considered part of the housing 702 since it helps to define the shape or form of the media player 700.

The media player 700 includes a rotational input device 710. The rotational input device 710 receives a rotational input action from a user of the media player 700. The rotational input action is used to control one or more control functions for controlling or interacting with the media player 700 (or application operating thereon). In one embodiment, the control function corresponds to a scrolling feature. The direction of scrolling can vary depending on implementation. For example, scrolling may be implemented vertically (up or down) or horizontally (left or right). For example, in the case of a music player, the moving finger may initiate a control function for scrolling through a song menu displayed on the display screen 704. The term "scrolling" as used herein generally pertains to moving displayed data (e.g., text or graphics) across a viewing area on a display screen 704 so that at least one new item of data (e.g., line of text or graphics) is brought into view in the viewing area. In essence, the scrolling function allows a user to view sets of data currently outside of the viewing area. The viewing area may be the entire viewing area of the display screen 704 or it may be only a portion of the display screen 704 (e.g., a window frame).

By way of example, in the case of a music player (e.g., MP3 player), the scrolling feature may be used to help browse through songs stored in the music player. To elaborate, the display screen 704, during operation, may display a list of media items (e.g., songs). A user of the media player 700 is able to linearly scroll through the list of media items by providing a rotational input action using the rotational input device 710. The displayed items from the list of media items are varied commensurate with the rotational input action such that the user is able to effectively scroll through the list of media items. However, since the list of media items can be rather lengthy, the invention provides the ability for the user to rapidly traverse (or scroll) through the list of media items. In effect, the user is able to accelerate their traversal of the list of media items by providing the rotational input action at greater speeds. The direction of the rotational input action may be arranged to control the direction of scrolling.

In addition to above, the media player 700 may also include one or more buttons 712. The buttons 712 are configured to provide one or more dedicated control functions for making selections or issuing commands associated with operating the media player 700. By way of example, in the case of a music player, the button functions may be associated with opening a menu, playing a song, fast forwarding a song, seeking through a menu and the like. In most cases, the button functions are implemented via a mechanical clicking action. The position of the buttons 712 relative to the rotational input device 710 may be widely varied. For example, they may be adjacent to one another or spaced apart. In the illustrated embodiment, the buttons 712 are configured to surround the inner and outer perimeter of the rotational input device 710. In this manner, the buttons 712 may provide tangible surfaces that define the outer boundaries of the rotational input device 710. As shown, there are four buttons 712A that surround the outer perimeter and one button 712B disposed in the center or middle of the rotational input device 710. By way of example, the plurality of buttons 712 may consist of a menu button, play/stop button, forward seek button, reverse seek button, and the like.

Moreover, the media player 700 may also include a power switch 714, a headphone jack 716 and a data port 718. The power switch 714 is configured to turn the media device 700 on and off. The headphone jack 716 is capable of receiving a headphone connector associated with headphones configured for listening to sound being outputted by the media device 700. The data port 718 is capable of receiving a data connector/cable assembly configured for transmitting and receiving data to and from a host device, such as a general purpose computer. By way of example, the data port 718 may be used to upload or download songs to and from the media device 700. The data port 718 may be widely varied. For example, the data port may be a PS/2 port, a serial port, a parallel port, a USB port, a FireWire port, and the like. In some cases, the data port 718 may be a radio frequency (RF) link or optical infrared (IR) link to eliminate the need for a cable. Although not shown in FIG. 7B, the media player 700 may also include a power port that receives a power connector/cable assembly configured for delivering power to the media player 700. In some cases, the data port 718 may serve as both a data and a power port.

Figure 8A:
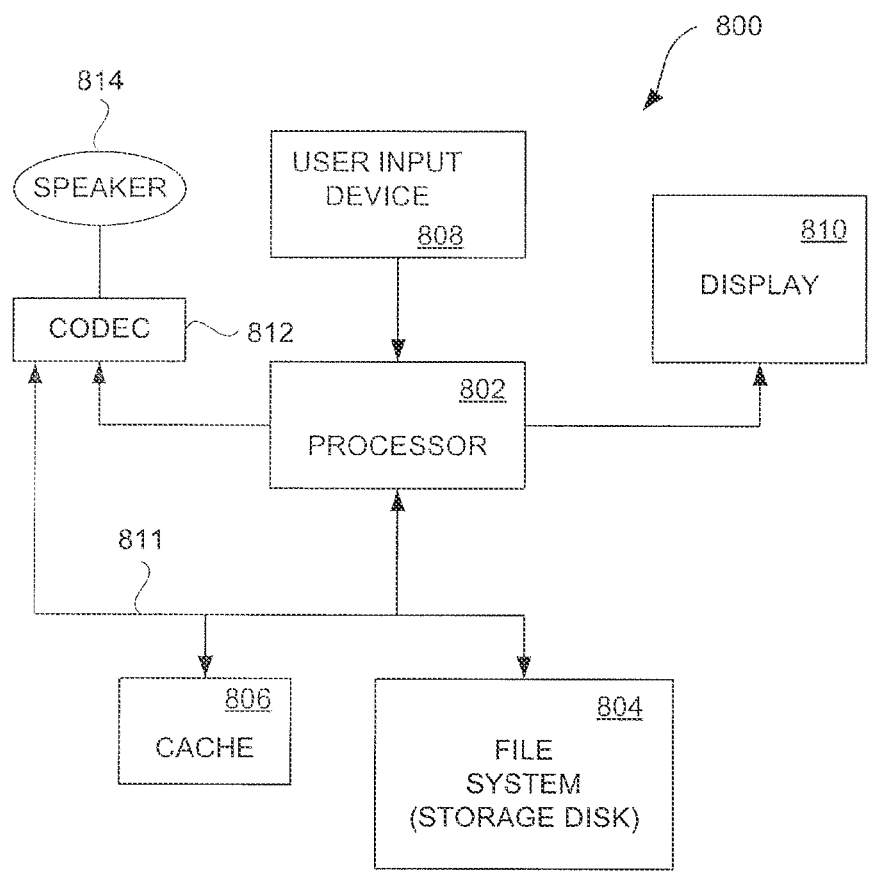
FIG. 8A is a block diagram of a media player according to one embodiment of the invention.

FIG. 8A is a block diagram of a media player 800 according to one embodiment of the invention. The media player 800 can, for example, represent internal components of the media player 700.

The media player 800 includes a processor 802 that pertains to a microprocessor or controller for controlling the overall operation of the media player 800. The media player 800 stores media data pertaining to media items in a file system 804 and a cache 806. The file system 804 is, typically, a storage disk or a plurality of disks. The file system typically provides high capacity storage capability for the media player 800. However, since the access time to the file system 804 is relatively slow, the media player 800 also includes a cache 806. The cache 806 is, for example, Random-Access Memory (RAM) provided by semiconductor memory. The relative access time to the cache 806 is substantially shorter than for the file system 804. However, the cache 806 does not have the large storage capacity of the file system 804. Further, the file system 804, when active, consumes more power than does the cache 806. The power consumption is particularly important when the media player 800 is a portable media player that is powered by a battery (not shown).

The media player 800 also includes a user input device 808 that allows a user of the media player 800 to interact with the media player 800. For example, the user input device 808 can take a variety of forms, such as a button, keypad, dial, etc. Still further, the media player 800 includes a display 810 (screen display) that can be controlled by the processor 802 to display information to the user. A data bus 811 can facilitate data transfer between at least the file system 804, the cache 806, the processor 802, and the coder/decoder (CODEC) 812. The media player 800 can also include an audio feedback unit (not shown) to provide audio feedback for user interactions (such as with the user input device 808).

In one embodiment, the media player 800 serves to store a plurality of media items (e.g., songs) in the file system 804. When a user desires to have the media player play a particular media item, a list of available media items is displayed on the display 810. Then, using the user input device 808, a user can select one of the available media items. The processor 802, upon receiving a selection of a particular media item, supplies the media data (e.g., audio file) for the particular media item to a coder/decoder (CODEC) 812. The CODEC 812 then produces analog output signals for a speaker 814. The speaker 814 can be a speaker internal to the media player 800 or external to the media player 800. For example, headphones or earphones that connect to the media player 800 would be considered an external speaker.

Figure 8B:
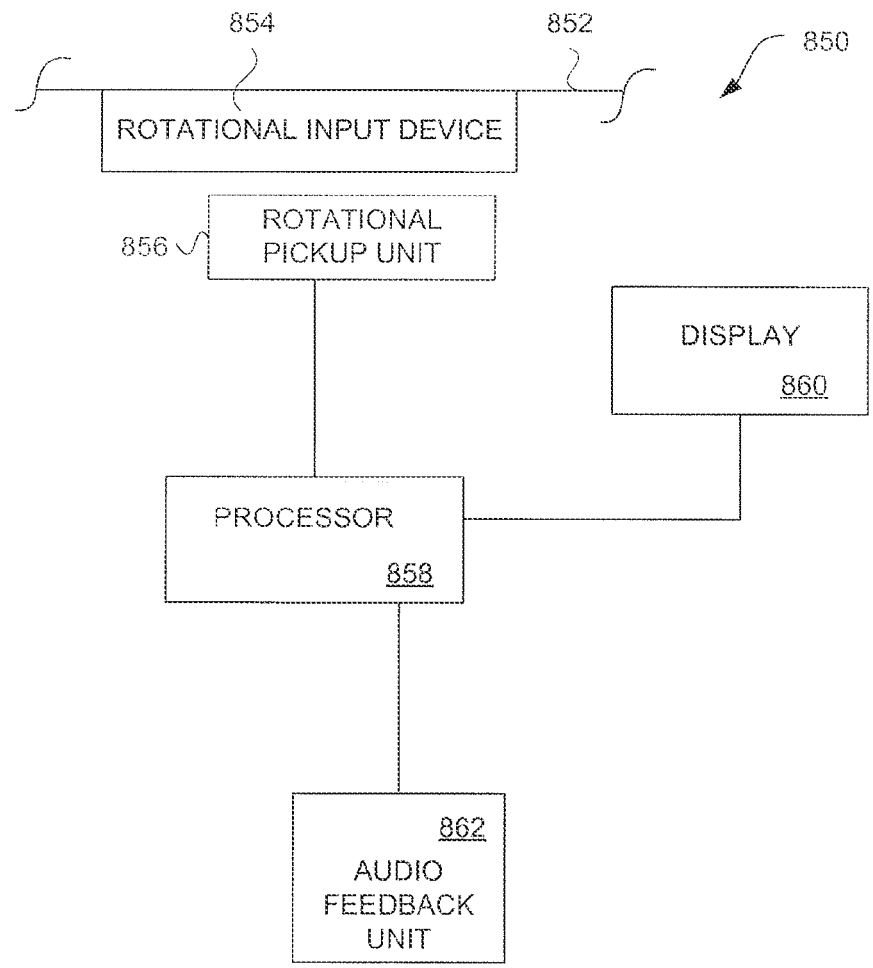
FIG. 8B is a block diagram of a computing system according to one embodiment of the invention.

FIG. 8B is a block diagram of a computing system 850 according to one embodiment of the invention. The computing system 850 can, for example, represent a portion of any of the computer system 650 shown in FIG. 7A, the media player 700 shown in FIG. 7B, or the media player 800 shown in FIG. 8A.

The computing system 850 includes a housing 852 that exposes a rotational input device 854. The housing 852 can be a computer's housing or an input/output device's housing. The rotational input device 854 permits a user to interact with the computing system 850 through a rotational action. The rotational action results from either rotation of the rotational input device 854 itself or by rotation of a stylus or user's finger about the rotational input device 854. As examples, the rotational input device 854 can be a rotary dial (including, e.g., a navigational wheel or a scroll wheel) capable of being rotated or a touch pad capable of rotational sensing. In one embodiment, the touch pad has a circular shape. A rotation pickup unit 856 couples to the rotational input device 854 to sense the rotational action. For example, the rotational pickup unit 856 can be optically or electrically coupled to the rotational input device 854.

The computing system 850 further includes a processor 858, a display 860 and an audio feedback unit 862. Signals pertaining to the rotational action are supplied to the processor 858. The processor 858 not only performs processing operations for application programs hosted by the computing system 850 but also can control the display 860 and the audio feedback unit 862. Alternatively, a specialized controller or other circuitry can support the processor 858 in controlling the display 860 or the audio feedback unit 862.

The processor 858 causes a display screen to be produced on the display 860. In one implementation, the display screen includes a selectable list of items (e.g., media items) from which a user may select one or more of the items. By the user providing a rotational action with respect to the rotational input device 854, the list can be scrolled through. The processor 858 receives the signals pertaining to the rotational action from the rotation pickup unit 856. The processor 858 then determines the next items of the list that are to be presented on a display screen by the display 860. In making this determination, the processor 858 can take into consideration the length of the list. Typically, the processor 858 will determine the rate of the rotational action such that the transitioning to different items in the media list can be performed at a rate proportional to the rate of the rotational action.

The processor 858 can also control the audio feedback unit 862 to provide audio feedback to a user. The audio feedback can, for example, be a clicking sound produced by the audio feedback unit 862. In one embodiment, the audio feedback unit 862 is a piezoelectric buzzer. As the rate of transitioning through the list of items increases, the frequency of the clicking sounds can increase. Alternatively, when the rate that the rotational input device 854 is turned slows, the rate of transitioning through the list of items decreases, and thus the frequency of the clicking sounds correspondingly slows. Hence, the clicking sounds provide audio feedback to the user as to the rate in which the items within the list of items are being traversed.

Figure 9:
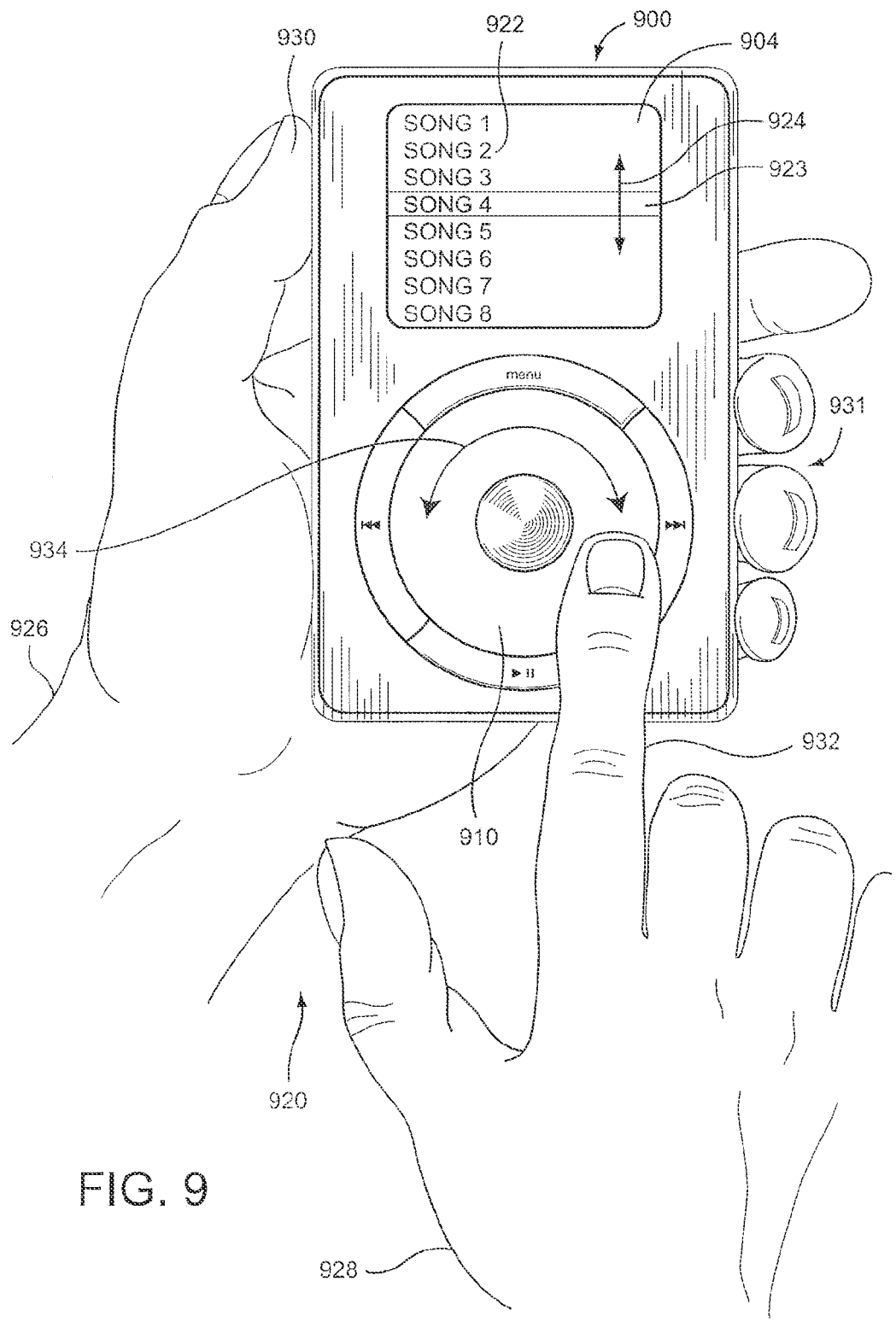
FIG. 9 shows the media player of FIG. 7B being used by a user in accordance with one embodiment of the invention.

FIG. 9 shows the media player 700 of FIG. 7B being used by a user 920 in accordance with one embodiment of the invention. In this embodiment, the user 920 is linearly scrolling (as shown by arrow 924) through a list of songs 922 displayed on the display screen 904 via a slider bar 923. As shown, the media device 900 is comfortably held in one hand 926 while being comfortably addressed by the other hand 928. This configuration generally allows the user 920 to easily actuate the rotational input device 910 with one or more fingers. For example, the thumb 930 and right-most fingers 931 (or left-most fingers if left handed) of the first hand 926 are used to grip the sides of the media player 900 while a finger 932 of the opposite hand 928 is used to actuate the rotational input device 910.

Referring to FIG. 9, and in accordance with one embodiment of the invention, the rotational input device 910 can be continuously actuated by a circular motion of the finger 932 as shown by arrow 934. For example, the finger may rotate relative to an imaginary axis. In particular, the finger can be rotated through 360 degrees of rotation without stopping. This form of motion may produce incremental or accelerated scrolling through the list of songs 922 being displayed on the display screen 904.

Figure 10A:
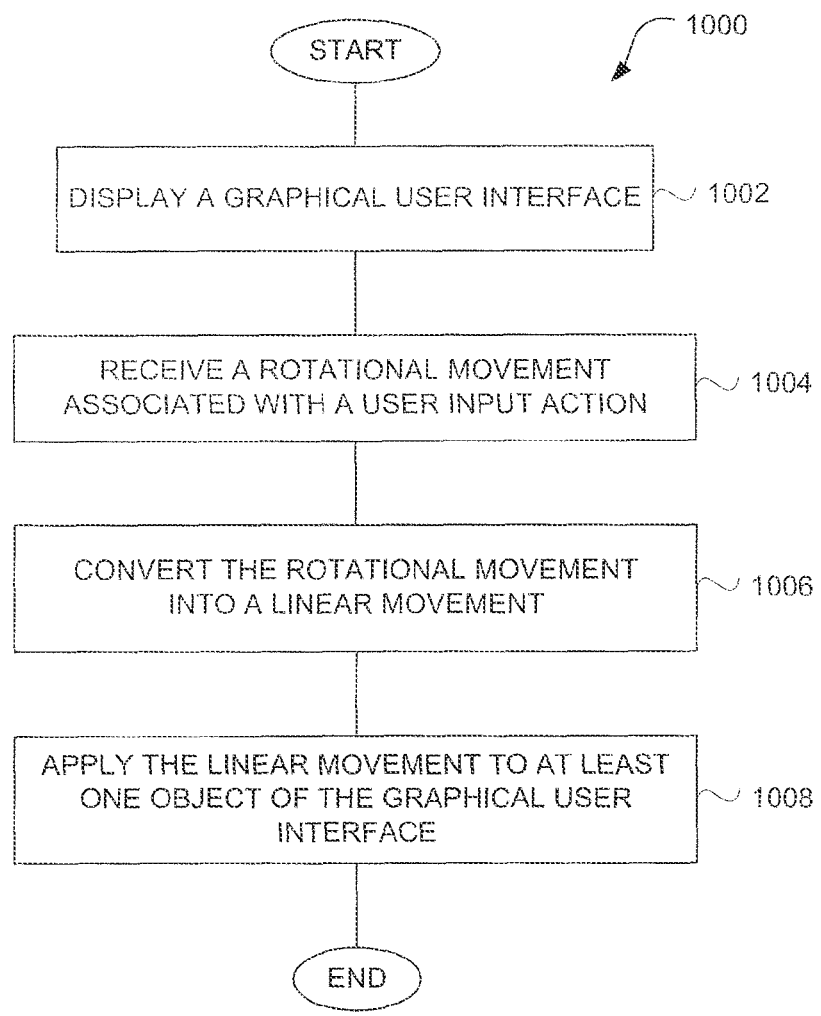
FIG. 10A is a flow diagram of user input processing according to one embodiment of the invention.

FIG. 10A is a flow diagram of user input processing 1000 according to one embodiment of the invention. The user input processing 1000 is, for example, performed with respect to the computer system 650 illustrated in FIG. 7A or the media player 700 illustrated in FIG. 7B.

The user input processing 1000 displays 1002 a graphical user interface. Then, a rotational movement associated with a user input action is received 1004. Here, the user input action is generally angular, as opposed to linear, and thus pertains to a rotational movement. As discussed in more detail below, the rotational movement can be provided by the user input action. In one example, the rotational movement can be caused by a user acting to rotate a navigational wheel through a user input action. In another example, the rotational movement can be caused by a user's finger or a stylist being moved in a rotational manner through a user input action with respect to a touch pad. After the rotational movement has been received 1004, the rotational movement is converted 1006 into a linear movement. The linear movement is then applied 1008 to at least one object of the graphical user interface. For example, the object of the graphical user interface can be a list, menu or other object having a plurality of selectable items. The linear movement can effect a scroll type action with respect to the object (e.g., list or menu). Alternatively, the linear movement can effect a level adjustment (e.g., volume adjustment) or position adjustment (e.g., slider bar position). After the linear movement has been applied 1008, the user input processing 1000 is complete and ends.

Figure 10B:
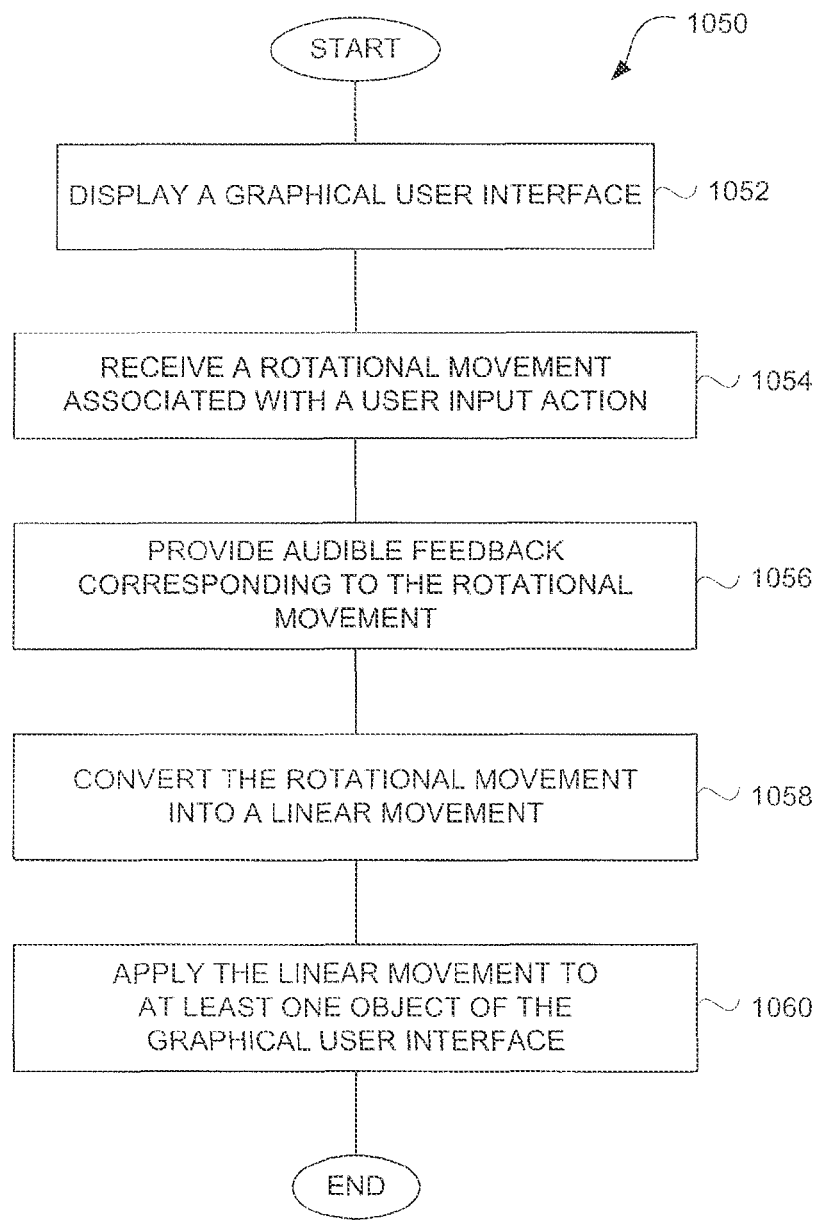
FIG. 10B is a flow diagram of user input processing according to another embodiment of the invention.

FIG. 10B is a flow diagram of user input processing 1050 according to another embodiment of the invention. The user input processing 1050 is, for example, performed with respect to the computer system 650 illustrated in FIG. 7A or the media player 700 illustrated in FIG. 7B.

The operations 1052-1060 performed by the user input processing 1050 are similar to those like operations performed by the user input processing 1000 illustrated in FIG. 10A. Additionally, the user input processing 1050 operates to provide 1056 audible feedback corresponding to the rotational movements. In other words, as the rotational movement associated with user input action is received 1054, audible feedback corresponding to the rotational movement is provided 1056. Such audible feedback provides the user with feedback concerning the extent to which rotational movement has been input. In one embodiment, the rotational movement associated with user input action is converted into linear movement and applied to an object of a graphical user interface. For example, when the object of the graphical user interface is a multi-item list that is displayed for user scrolling and selection actions, the rotational movement associated with the user input action represents a distance traversed in the multi-item list. When acceleration is applied, the distance traversed is increased (e.g., multiplied). In one embodiment, the audible feedback is provided through a piezoelectric buzzer that is controlled by a processor (or other circuitry). For example, the audio feedback unit 862 shown in FIG. 8B can be a piezoelectric buzzer. The controller for the piezoelectric buzzer can, for example, be a processor of the computer system 650 or the media player 700, or some other circuitry coupled to the piezoelectric buzzer.

Figure 11:
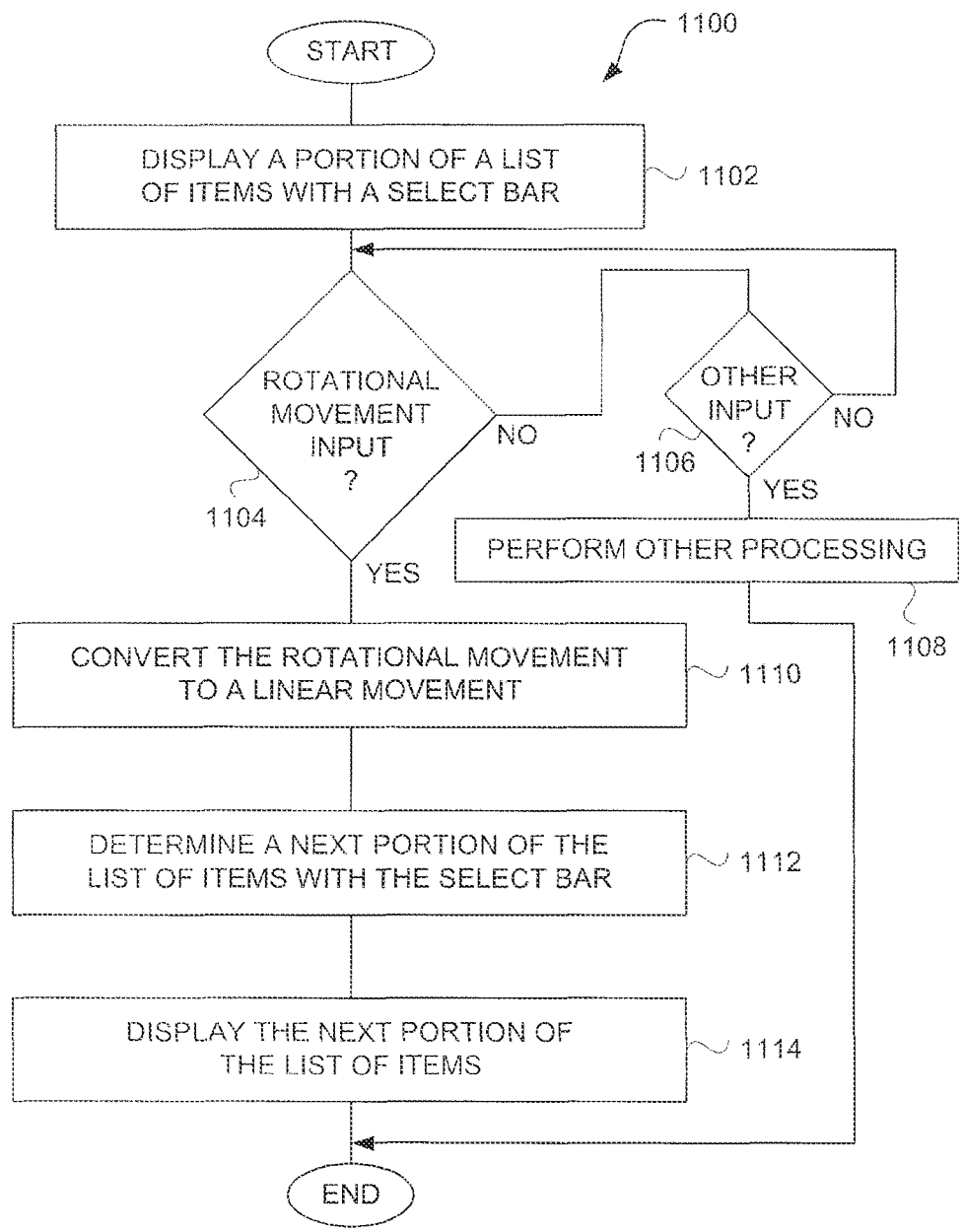
FIG. 11 is a flow diagram of user input processing according to another embodiment of the invention.

FIG. 11 is a flow diagram of user input processing 1100 according to another embodiment of the invention. The user input processing 1100 is, for example, performed by a computing device, such as the computer system 650 illustrated in FIG. 7A or the media player 700 illustrated in FIG. 7B.

The user input processing 1100 begins by the display 1102 of a portion of a list of items together with a select bar. The select bar typically points to or highlights one or more of the items of the list of items. In general, the select bar can be associated with any sort of visual indication specifying one or more of the items of the list of items. Hence, the select bar is one type of visual indicator. Next, a decision 1104 determines whether a rotational movement input has been received. When the decision 1104 determines that a rotational movement input has not yet been received, then a decision 1106 determines whether another input has been received. Here, the inputs are provided by a user of the computing device performing or associated with the user input processing 1100. When the decision 1106 determines that another input has been received, then other processing is performed 1108 to perform any operations or actions caused by the other input. Following the operation 1108, the user input processing 1100 is complete and ends. On the other hand, when the decision 1106 determines that no other input has been received, then the user input processing 1100 returns to repeat the decision 1104.

Once the decision 1104 determines that a rotational movement input has been received, then the rotational movement is converted 1110 to a linear movement. Then, a next portion of the list of items (and placement of the select bar over one of the items) is determined 1112. Thereafter, the next portion of the list of items is displayed 1114. The linear movement operates to move the select bar (or other visual identifier) within the list. In other words, the select bar is scrolled upwards or downwards (in an accelerated or unaccelerated manner) by the user in accordance with the linear motion. As the scrolling occurs, the portion of the list being displayed changes. Following the operation 1114, the user input processing 1100 is complete and ends. However, if desired, the user input processing 1100 can continue following operation 1114 by returning to the decision 1104 such that subsequent rotational movement inputs can be processed to view other portions of the list items in a similar manner.

Figure 12:
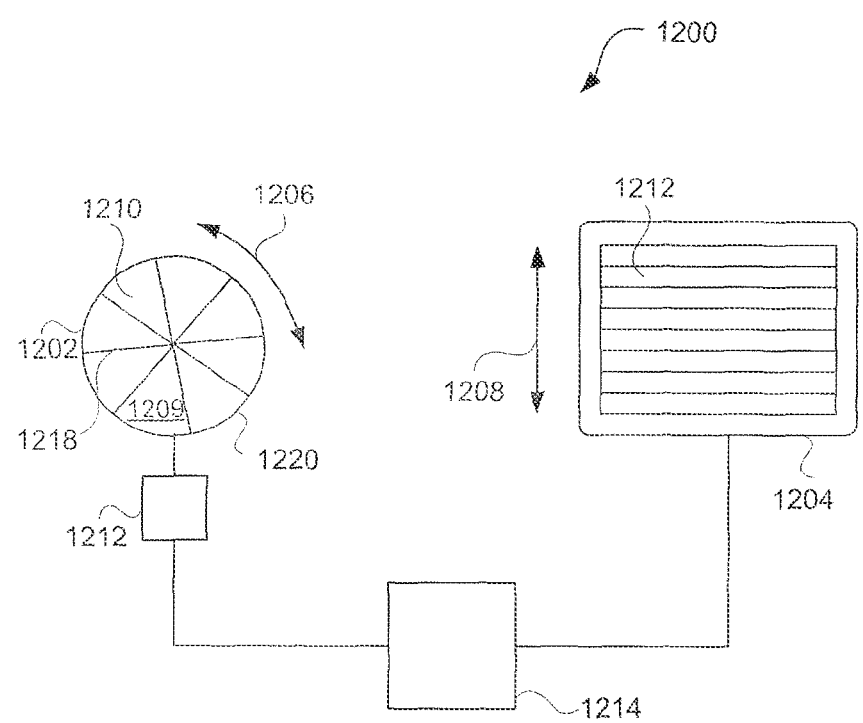
FIG. 12 is a block diagram of a rotary input display system in accordance with one embodiment of the invention.

FIG. 12 is a block diagram of a rotary input display system 1200 in accordance with one embodiment of the invention. By way of example, the rotary input display system 1200 can be performed by a computing device, such as the computer system 650 illustrated in FIG. 7A or the media player 700 illustrated in FIG. 7B. The rotary input display system 1200 utilizes a rotational input device 1202 and a display screen 1204. The rotational input device 1202 is configured to transform a rotational motion 1206 by a user input action (e.g., a swirling or whirling motion) into translational or linear motion 1208 on the display screen 1204. In one embodiment, the rotational input device 1402 is arranged to continuously determine either the angular position of the rotational input device 1202 or the angular position of an object relative to a planar surface 1209 of the rotational input device 1202. This allows a user to linearly scroll through a media list 1211 on the display screen 1204 by inducing the rotational motion 1206 with respect to the rotational input device 1202.

The rotary input display system 1200 also includes a control assembly 1212 that is coupled to the rotational input device 1202. The control assembly 1212 is configured to acquire the position signals from the sensors and to supply the acquired signals to a processor 1214 of the system. By way of example, the control assembly 1212 may include an application-specific integrated circuit (ASIC) that is configured to monitor the signals from the sensors to compute the angular location and direction (and optionally speed and acceleration) from the monitored signals and to report this information to the processor 1214.

The processor 1214 is coupled between the control assembly 1212 and the display screen 1204. The processor 1214 is configured to control display of information on the display screen 1204. In one sequence, the processor 1214 receives angular motion information from the control assembly 1212 and then determines the next items of the media list 1211 that are to be presented on the display screen 1204. In making this determination, the processor 1214 can take into consideration the length of the media list 1211. Typically, the processor 1214 will determine the rate of movement such that the transitioning to different items in the media list 1211 can be performed faster or in an accelerated manner when moved at non-slow speeds or proportional with greater speeds. In effect, to the user, rapid rotational motion causes faster transitioning through the list of media items 1211. Alternatively, the control assembly 1212 and processor 1214 may be combined in some embodiments.

Although not shown, the processor 1214 can also control a buzzer to provide audio feedback to a user. The audio feedback can, for example, be a clicking sound produced by a buzzer 1216. In one embodiment, the buzzer 1216 is a piezoelectric buzzer. As the rate of transitioning through the list of media items increases, the frequency of the clicking sounds increases. Alternatively, when the rate of transitioning slows, the frequency of the clicking sounds correspondingly slows. Hence, the clicking sounds provide audio feedback to the user as to the rate in which the media items within the list of media items are being traversed.

The various aspects, features or embodiments of the invention described above can be used alone or in various combinations. The invention is preferably implemented by a combination of hardware and software, but can also be implemented in hardware or software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. It should be noted that this is not an exhaustive list and there may be other advantages which are not described herein. One advantage of the invention is that a user is able to traverse through a displayed list of items using a rotational user input action. Another advantage of the invention is that a user is able to easily and rapidly traverse a lengthy list of items. Still another advantage of the invention is the rate of traversal of the list of media items can be dependent on the rate of rotation of a dial (or navigation wheel). Yet still another advantage of the invention is that audible sounds are produced to provide feedback to users of their rate of traversal of the list of media items.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method, comprising:
    at a portable electronic device with a display, a rotational input device, and an audio feedback unit:
    displaying a list of items with the display;
    detecting rotational movement of the rotational input device itself in a first direction; and,
    in response to detecting rotational movement of the rotational input device itself in the first direction:
        scrolling the list of items to an entry in the list, and
        outputting, with the audio feedback unit, a plurality of audible sound effects that are output at different times at a particular rate, wherein the particular rate, which determines the times at which the audible sound effects are output, is based on a characteristic of the detected rotational-movement.

2. The method of claim 1, wherein the entry in the list corresponds to a media item.

3. The method of claim 1, wherein the characteristic of the detected rotational movement is a speed of the detected rotational movement.

4. The method of claim 1, wherein the particular rate increases as the detected rotational movement increases.

5. The method of claim 1, wherein the particular rate is proportional to a rate of the detected rotational movement.

6. The method of claim 1, wherein the particular rate indicates a rate at which the items in the list are being scrolled.

7. The method of claim 1, including:
    in response to detecting rotational movement of the rotational input device itself:
        moving a visual indicator to the entry in the list.

8. A portable electronic device, comprising:
    a display;
    a rotational input device;
    an audio feedback unit;
    a processor; and non-transitory computer readable storage media including instructions configured to be executed by the processor, including instructions for:
- displaying a list of items with the display;
- detecting rotational movement of the rotational input device itself in a first direction; and,
- in response to detecting rotational movement of the rotational input device itself in the first direction:
  - scrolling the list of items to an entry in the list, and
  - outputting, with the audio feedback unit, a plurality of audible sound effects that are output at different times at a particular rate, wherein the particular rate, which determines the times at which the audible sound effects are output, is based on a characteristic of the detected rotational movement.

9. The device of claim 8, wherein the entry in the list corresponds to a media item.

10. The device of claim 8, wherein the characteristic of the detected rotational movement is a speed of the detected rotational movement.

11. The device of claim 8, wherein the particular rate increases as the detected rotational movement increases.

12. The device of claim 8, wherein the particular rate is proportional to a rate of the detected rotational movement.

13. The device of claim 8, wherein the particular rate indicates a rate at which the items in the list are being scrolled.

14. The device of claim 8, including instructions configured to cause the processor to perform operations including:
- in response to detecting rotational movement of the rotational input device itself:
  - moving a visual indicator to the entry in the list.

15. A non-transitory computer readable storage media including instructions that when executed by a portable electronic device with a display, a rotational input device, an audio feedback unit, and a processor, cause the portable electronic device to:
- display a list of items with the display;
- detect rotational movement of the rotational input device itself in a first direction; and,
- in response to detecting rotational movement of the rotational input device itself in the first direction:
  - scroll the list of items to an entry in the list, and
  - output, with the audio feedback unit, a plurality of audible sound effects that are output at different times at a particular rate, wherein the particular rate, which determines the times at which the audible sound effects are output, is based on a characteristic of the detected rotational movement.

16. The computer readable storage media of claim 15, wherein the entry in the list corresponds to a media item.

17. The computer readable storage media of claim 15, wherein the characteristic of the detected rotational movement is a speed of the detected rotational movement.

18. The computer readable storage media of claim 15, wherein the particular rate increases as the detected rotational movement increases.

19. The computer readable storage media of claim 15, wherein the particular rate is proportional to a rate of the detected rotational movement.

20. The computer readable storage media of claim 15, wherein the particular rate indicates a rate at which the items in the list are being scrolled.

21. The computer readable storage media of claim 15, including instructions that when executed cause the portable electronic device to:
- in response to detecting rotational movement of the rotational input device itself:
  - move a visual indicator to the entry in the list.

* * * * *